US011218203B1

(12) United States Patent
Lee et al.

(10) Patent No.: US 11,218,203 B1
(45) Date of Patent: Jan. 4, 2022

(54) COORDINATED DYNAMIC ANALOG BEAMFORMER

(71) Applicant: Amazon Technologies, Inc., Seattle, WA (US)

(72) Inventors: Tzung-I Lee, San Jose, CA (US); Kun Ting Tsai, Fremont, CA (US); Haritha Tamvada, San Jose, CA (US); Kwok Shing Lee, San Mateo, CA (US); Cheol Su Kim, San Jose, CA (US); Omar Fawazhashim Zakaria, Saratoga, CA (US); In Chul Hyun, Saratoga, CA (US); Ali Mirkamali, Sunnyvale, CA (US); Dan Richard Brukwinski, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 16/776,235

(22) Filed: Jan. 29, 2020

(51) Int. Cl.
| | |
|---|---|
| *H04B 7/06* | (2006.01) |
| *H04B 7/0413* | (2017.01) |
| *H01Q 3/34* | (2006.01) |
| *H04W 88/02* | (2009.01) |
| *H04W 84/12* | (2009.01) |

(52) U.S. Cl.
CPC ............ *H04B 7/0617* (2013.01); *H01Q 3/34* (2013.01); *H04B 7/0413* (2013.01); *H04W 84/12* (2013.01); *H04W 88/02* (2013.01)

(58) Field of Classification Search
CPC ........ H01Q 3/34; H04W 84/12; H04W 88/02; H04B 7/0617; H04B 7/0413
See application file for complete search history.

(56) References Cited

U.S. PATENT DOCUMENTS

| | | | |
|---|---|---|---|
| 2014/0370936 A1* | 12/2014 | Ling .................... | H04B 1/1027 455/562.1 |
| 2018/0227878 A1* | 8/2018 | Lashkarian ............. | G01S 3/143 |
| 2020/0037264 A1* | 1/2020 | Ciccarelli ............. | H04L 5/0082 |
| 2021/0135739 A1* | 5/2021 | Cohn .................... | H04B 7/0693 |

\* cited by examiner

*Primary Examiner* — Vineeta S Panwalkar
(74) *Attorney, Agent, or Firm* — Lowenstein Sandler LLP

(57) ABSTRACT

Technologies directed to coordinated dynamic analog beamforming are described. One method includes receiving, by a digital controller of a first wireless device, a data packet, the data packet comprising a destination address of a second wireless device. The method further includes retrieving, from memory, beamformer configuration data associated with the destination address, the beamformer configuration data comprising a phase shifter angle value for a radiation pattern. The method sends, to a beamformer circuit, the phase shifter angle value, the beamformer circuit comprises a power splitter and a set of phase shifters (e.g., at least four). The method causes the set of phase shifters to steer the radiation pattern of electromagnetic energy, radiated by an antenna array of elements, at the phase shifter angle value and sends the data packet to the second wireless device via the antenna array.

18 Claims, 15 Drawing Sheets

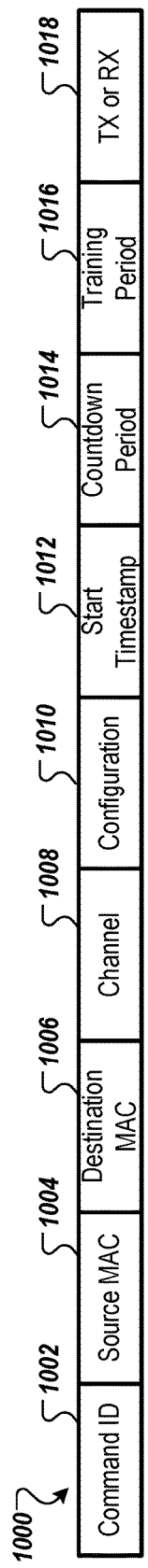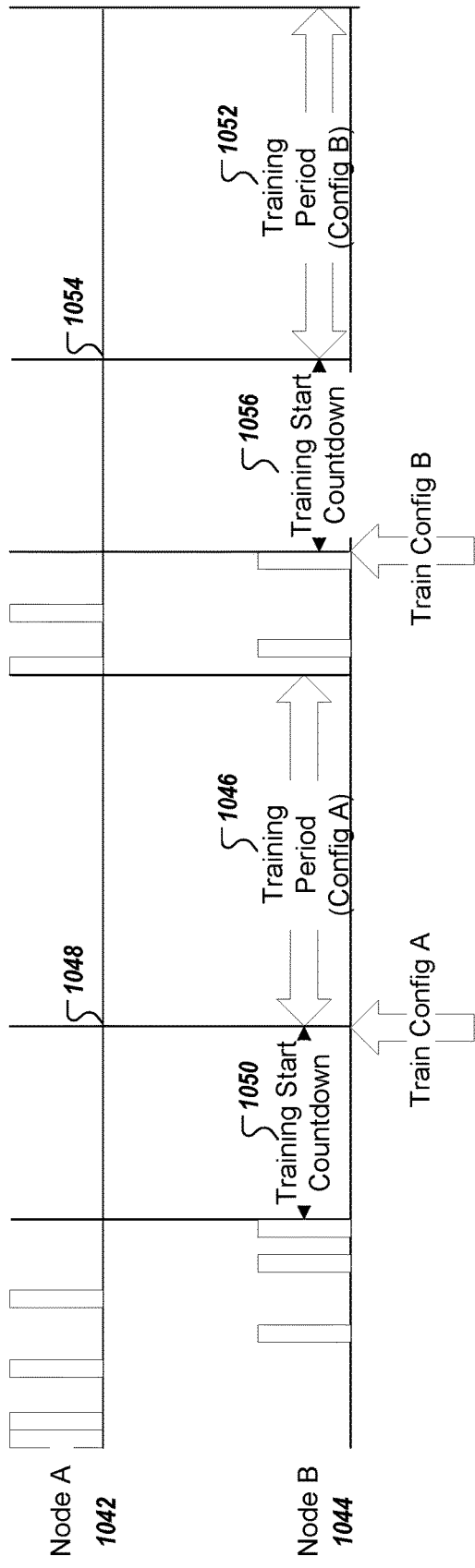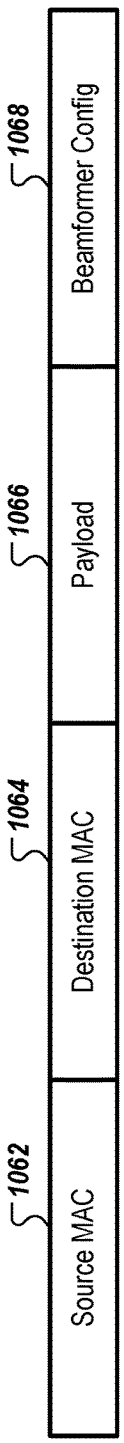
FIG. 10A
FIG. 10B
FIG. 10C
FIG. 10D

COORDINATED DYNAMIC ANALOG BEAMFORMER

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 10A illustrates an example training command according to one embodiment.

FIG. 10B illustrates an example SNR report according to one embodiment.

FIG. 10C is a timing diagram of two training periods to train each pair of nodes to perform neighbor discovery training to populate a neighbor SNR matrix table according to one embodiment.

FIG. 10D illustrates an example packet format of a data packet with beamformer configuration information according to one embodiment.

DETAILED DESCRIPTION

Figure 1:
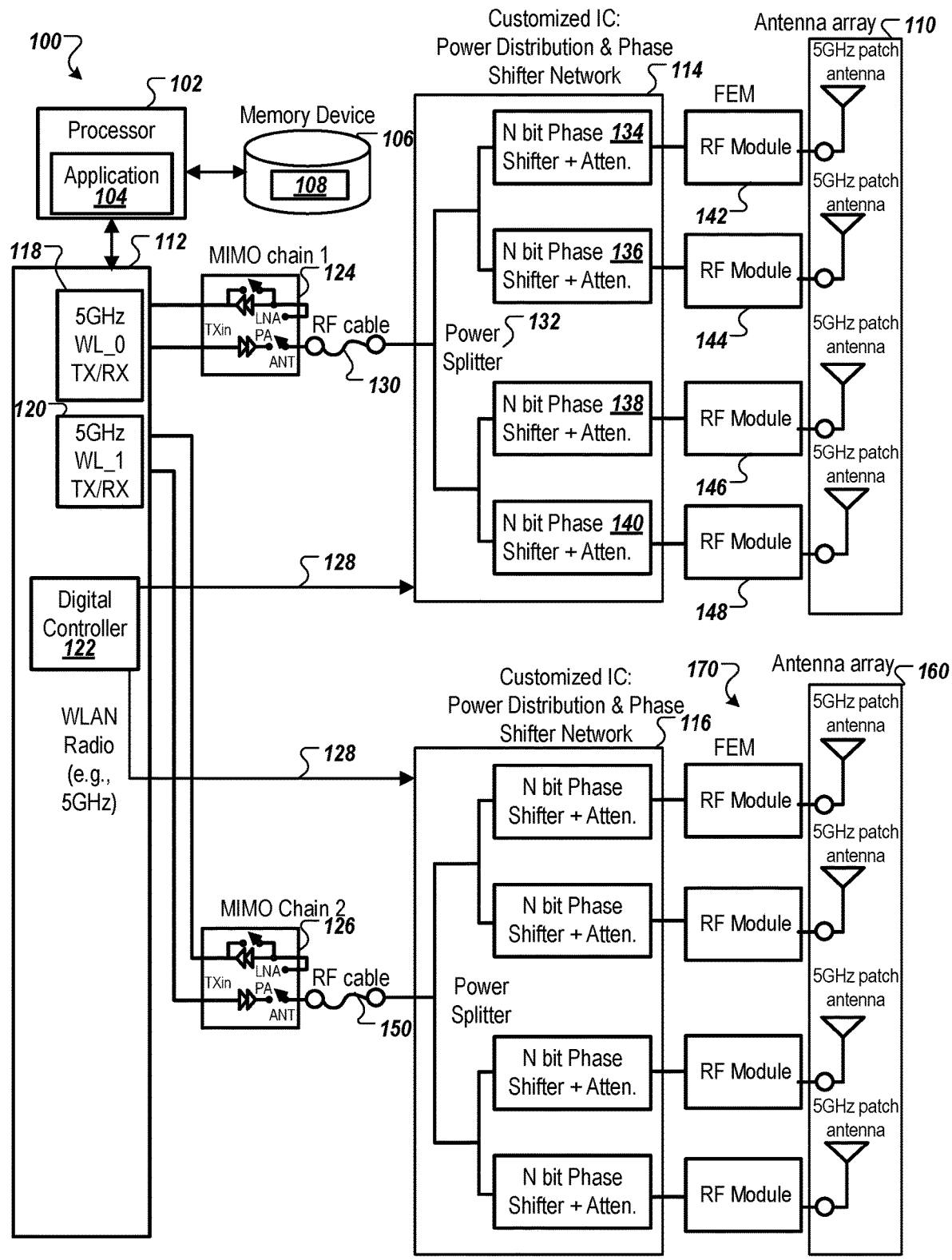
FIG. 1 is a block diagram of a scalable architecture of a wireless device for coordinated dynamic analog beamforming according to one embodiment.

Technologies directed to coordinated dynamic analog beamforming are described. Beamforming is commonly used in IEEE 802.11 wireless transmissions to improve signal-to-noise ratio (SNR). Two types of beamforming technologies which are commonly used today are digital beamforming and analog beamforming. Digital beamforming uses special sounding packets to derive the accurate phase between the transmitter and the receiver. The disadvantages of digital beamforming are that digital beamforming only improves the SNR of high modulation and coding scheme (MCS) data packets; thus, digital beamforming does not help devices that are using low data rates and does not improve the range of management, control, and action frames. MCS is a way to organize data surrounding how transmitters in wireless local area networks (WLANs) prepare data to be sent using various technologies. When any device, either AP or client wants to transmit, it will choose one of multiple MCSs (identified as a MCS index) and attempt with that unique set of technical features. If it is successful and the transmitter receives an acknowledgement (ACK), then the device will most likely continue to use that set of features as categorized by an MCS index. If it repeatedly fails, then each individual firmware logic will make a different choice of paths through the set of MCS indexes in order to find a feature set that is effective.

Analog beamforming overcomes these limitations of digital beamforming; however, conventional analog beamformers could only do point-to-point communication since the phase and amplitude of the beamformer are statically set to generate only one single beam. Using conventional analog beamformers, antenna alignment between two devices can be difficult and time consuming. In addition to antenna alignment being difficult and time consuming, conventional a conventional high-performance beamforming antenna for sub-7 GHz operation is very expensive. Also, long distance point-to-point (PtP) communication is challenging because of Equivalent Isotropically Radiated Power (EIRP) limits, cable loss, and cost and installation of high gain antenna. Also, a fan-beam antenna radiation pattern of a conventional high-performance beamforming antenna generates and receives interference more so than other radiation patterns, such as a pencil-beam radiation pattern. Also, in some cases, long cables are needed between the conventional high-performance beamforming antennas and the radio and the long cables can degrade wireless performance.

Aspects of the present disclosure overcome the deficiencies of both the digital analog beamformers and conventional analog beamformers by providing a coordinated dynamic analog beamformer. The coordinated dynamic analog beamformer dynamically adjusts a per-packet analog beam using a dynamic neighbor lookup database, analog beamformer hardware, and web-based coordination (e.g., a cloud coordinator service) as described in more detail herein. One method includes receiving, by a digital controller of a first wireless device, a data packet, the data packet comprising a destination address of a second wireless device. The method further includes retrieving, from memory, beamformer configuration data associated with the destination address, the beamformer configuration data comprising a phase shifter angle value for a pencil-beam radiation pattern. The method sends, to a beamformer circuit, the phase shifter angle value, the beamformer circuit comprises a power splitter and a set of phase shifters (e.g., at least four). The method causes the set of phase shifters to steer the pencil-beam radiation pattern of electromagnetic energy, radiated by an antenna array of elements, at the phase shifter angle value and sends the data packet to the second wireless device via the antenna array.

Aspects of the present disclosure provide a lower-cost antenna beamformer architecture that enables automatic beam alignment and scanning. Aspects of the present disclosure can provide a scalable architecture in a single stockkeeping unit (SKU) for short-range communication links (e.g., less than 200 meters (m), for mid-range communication links (e.g., approximately 500 m), and for long-range communication links (e.g., greater than 1 km), such as described below with respect to FIGS. 1-4. Aspects of the present disclosure can reduce interference level by using a steerable pencil beam that can obtain the same or similar coverage as the fan-beam pattern. Aspects of the present disclosure can enable long-distance communication with a compact size antenna beamformer in a frequency range of approximately 5-7 GHz, for example. Aspects of the present disclosure can utilize a neighbor lookup database and a cloud coordinate for dynamic beam coordination as described below.

FIG. 1 is a block diagram of a scalable architecture of a wireless device 100 for coordinated dynamic analog beamforming according to one embodiment. The wireless device 100 is also referred to herein as "dynamic analog beamformer" or "analog beamformer." The wireless device 100 includes a processor 102 that executes an application 104, a memory device 106 that stores storing beamformer configuration data 108, a first antenna array 110 of elements, a wireless local area network (WLAN) radio 112, and first beamformer circuit 114, and a second beamformer circuit 116. The WLAN radio 112 includes first transceiver circuitry 118 and second transceiver circuitry 120, and a digital controller 122. A first multiple-input, multiple-output (MIMO) chain 124 is coupled to the first transceiver circuitry 118 and a second MIMO chain 126 is coupled to the second transceiver circuitry 120. The first MIMO chain 124 can include a low noise amplifier (LNA) and a power amplifier (PA). In some cases, the first MIMO chain 12 is considered to be a front-end module (FEM). Instead of coupling the FEM directly to the antenna element, the FEM is coupled to the first antenna element via the first RF cable 130, the first beamformer circuit 114, and an optional RF module 142. The digital controller 122 outputs a phase control signal 128 via a digital control interface to the first beamformer circuit 114. The first beamformer circuit 114 is coupled to the digital controller 122, the first antenna array 110, and the first MIMO chain 124 via a first RF cable 130. The first beamformer circuit 114 includes a first power splitter 132 that is coupled to the first RF cable 130. The first beamformer circuit 114 can include a set of attenuators and a set of phase shifters. Alternatively, the first beamformer circuit 114 can include only a set of phase shifters. The number of attenuators and phase shifters in the set corresponds to a number of channels, referred to as M. As illustrated in FIG. 1, the first beamformer circuit 114 includes four attenuators and four phase shifters, but can be expanded to M, where M is a positive integer representing a number of channels. The first power splitter 132 can be a 1 to M power splitter coupled to M phase shifters and optionally coupled to M attenuators. The M attenuators can be used to reduce side lobes in the pencil-beam radiation pattern. The digital controller 122 can control the M phase shifter and the M attenuators to provide up to $2^{4(M)*N}$ different phase combinations via the digital control interface, where N is the number of bit phase control of the phase shifters. The phase shifters are also referred to as N-bit phase shifters. The first beamformer circuit 114 and the second beamformer circuit 116 can be separate integrated circuits or a single integrated circuit. The beamformer circuit can also be referred to as a beamformer chip or beamformer chipset.

In the depicted embodiment, the first beamformer circuit 114 includes a first attenuator and phase shifter 134, a second attenuator and phase shifter 136, a third attenuator and phase shifter 138, and a fourth attenuator and phase shifter 140, each coupled to the first power splitter 132. The first attenuator and phase shifter 134 is coupled to a first element of the first antenna array 110, the second attenuator and phase shifter 136 is coupled to a second element of the first antenna array 110, the third attenuator and phase shifter 138 is coupled to a third element of the first antenna array 110, and the fourth attenuator and phase shifter 140 is coupled to a fourth element of the first antenna array 110.

During operation, the digital controller 122 receives a data packet from the application 104. The data packet includes a destination address of a second wireless device. The digital controller 122 retrieves, from the memory device 106, the beamformer configuration data 108 that is associated with the destination address. In some cases, the memory device 106 can store the entire neighbor lookup database described herein. Alternatively, the memory device 106 can store the optimal selection table. Alternatively, the memory device 106 can store portions of the neighbor lookup database. The digital controller 122 sends, to the first beamformer circuit 114 via the digital control interface, a phase shifter angle value for a pencil-beam radiation pattern and a first attenuation value from the beamformer configuration data. The first beamformer circuit 114 causes the first phase shifter, the second phase shifter, the third phase shifter, and the fourth phase shifter to steer the pencil-beam radiation pattern of electromagnetic energy, radiated by the first antenna array, at the phase shifter angle value. In general, the antenna boresight is the axis of maximum gain (maximum radiated power) of a steerable antennas. The antenna boresight is the axis of symmetry in the radiation pattern, such as the main lobe. The phase shifter angle value can identify the boresight axis about which the main lobe of the radiation pattern is centered. In phased array antennas, the radiation pattern can be electronically steered, changing the angle of the boresight by shifting the relative phase of the radio waves emitted by different antenna elements. It is possible to radiate beams in multiple directions, i.e., multiple boresights. The first beamformer circuit sets the first attenuator, the second attenuator, the third attenuator, and the fourth attenuator to the first attenuation value. The first transceiver circuitry 118 sends the data packet to the second wireless device via the first antenna array 110.

In a further embodiment, the first beamformer circuit 114 includes or the wireless device includes 100 a first RF module 142 coupled between the first phase shifter and the first element, a second RF module 144 coupled between the second phase shifter and the second element, a third RF module 146 coupled between the third phase shifter and the third element, and a fourth RF module 148 coupled between the fourth phase shifter and the fourth element. The digital controller 122 sends, to the RF modules via the digital control interface, a first amplifier classifier from the beamformer configuration data 108. An amplifier classifier can specify whether no amplifier is used, whether a LNA is used for an RX mode only, or whether a LNA is used for an RX mode and a power amplifier is used for a TX mode. That is, the amplifier classifier can specify use of no amplifier, a LNA, or a LNA and PA. The amplifier classifier can be a value, such as 0 for when no amplifier is used, 1 when LNA only is used, and 2 when LNA and power amplifier are used, a description (e.g., no amplification, receive amplification, or transmit/receive amplification), an identifier, or the like. Each amplifier classifier can correspond to an amplifier configuration level or setting. The digital controller 122 sets the first RF module 142, the second RF module 144, the third RF module 146, and the fourth RF module 148 to the first amplifier value. In another embodiment, the RF modules can be part of the first beamformer circuit 114. In other embodiments, a front-end module (FEM) can be used before the MIMO chain and after the beamformer circuit, such as described below with respect to FIG. 4.

In the depicted embodiment, the second transceiver circuitry 120 is coupled to the second MIMO chain 126 and the second MIMO chain 126 is coupled to the second beamformer circuit 116 via a second RF cable 150. The second beamformer circuit 116 is coupled to a second antenna array 160 via a set of RF modules 170. The second beamformer circuit 116 includes a second power splitter coupled to the second RF cable 150 and four channels, each channel with an attenuator and a phase shifter, similar to those described above with respect to the first beamformer circuit 114.

During operation of the wireless device with the two antenna arrays, the digital controller 122 sends, to the second beamformer circuit 116 via the digital control interface, the phase control signal 128 with the phase shifter angle value and the first attenuation value from the beamformer configuration data. The second beamformer circuit 116 causes a fifth phase shifter, a sixth phase shifter, a seventh phase shifter, and an eighth phase shifter to steer the pencil-beam radiation pattern at the phase shifter angle value. The second beamformer circuit 116 sets a fifth attenuator, a sixth attenuator, a seventh attenuator, and an eighth attenuator to the first attenuation value. This can be done to reduce the side lobes of the pencil-beam radiation pattern.

The architecture described herein is not limited by only 8 antenna elements, as shown in FIG. 1 with 4 channels and 2 MIMO chains. Alternatively, the architecture can be expanded to M×Q antenna elements (M channels and Q MIMO chains) for even higher gain applications. That is, the first beamformer circuit 114 can include up to M channels for one MIMO chain and additional beamformer circuits can be used for up to Q MIMO chains being used. To accommodate power distribution to M channels, a power splitter of 1 to M is needed and each channel includes a phase shifter and an optional attenuator.

As described herein, the first beamformer circuit 114 (and the second beamformer circuit 116) can be a customized IC that includes power distribution and a phase shifter network with or without attenuation.

Figure 2:
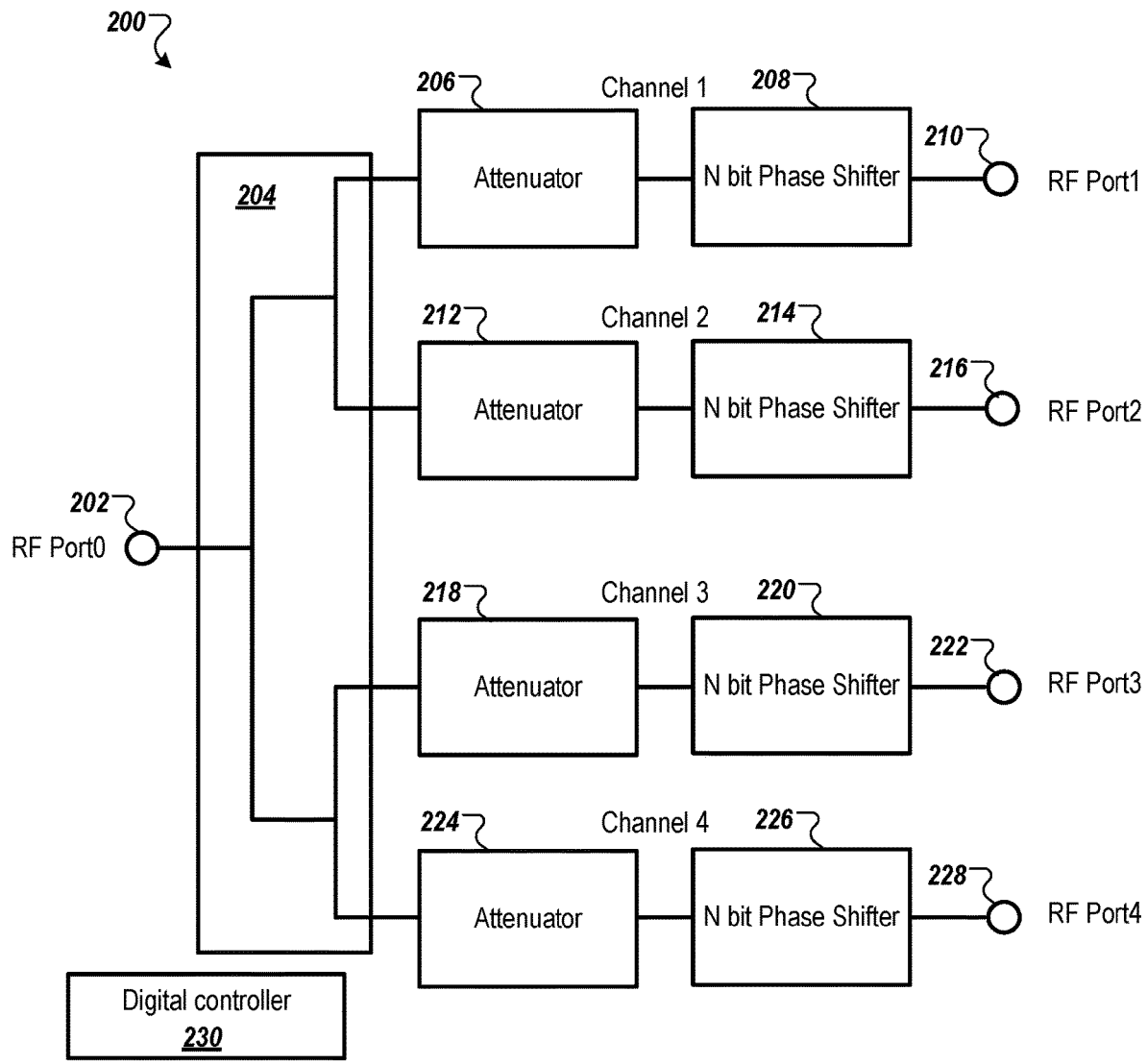
FIG. 2 is a block diagram of a beamformer integrated circuit (IC) for four channels according to one embodiment.

FIG. 2 is a block diagram of a beamformer integrated circuit (IC) 200 for four channels according to one embodiment. The beamformer IC 200 include a first RF port 202 that is coupled to a 1-4 power splitter 204 (also referred to as 1-4 power combiner) that creates 4 channels. The first channel includes a first attenuator 206 and a first N-bit phase shifter 208. The first channel is coupled to a second RF port 210. The second channel includes a second attenuator 212 and a second N-bit phase shifter 214. The second channel is coupled to a third RF port 216. The third channel includes a third attenuator 218 and a third N-bit phase shifter 220. The third channel is coupled to a fourth RF port 222. The fourth channel includes a fourth attenuator 224 and a fourth N-bit phase shifter 226. The fourth channel is coupled to a fifth RF port 228.

As described above, the beamformer IC 200 can be digitally controlled via a digital control interface. In one embodiment, the beamformer IC 200 includes a digital controller 230 for the digital control. The digital controller 230 can be coupled to a digital controller of a radio via a digital control interface, such as digital serial control interface that use the I$^2$C technology. The digital controller 230 can control the N-bit phase shifters to provide up to $2^{4*N}$ different phase combinations to steer a radiation pattern of an antenna array. In this embodiment, the second RF port 210, the third RF port 216, the fourth RF port 222, and the fifth RF port 228 are individually coupled to an element of the antenna array. In some cases, each of the second RF port 210, the third RF port 216, the fourth RF port 222, and the fifth RF port 228 is coupled to a RF module as described below with respect to FIG. 3.

The beamformer IC 200 is also referred to herein as beamformer chip or beamformer chipset. The beamformer IC 200 can be a low-cost customized four-channel beamformer chip that can reduce cost by more than a tenth of current off-the-shelf devices, that provides performance optimization, provide a reduction in packet size, provide a reduction significant board space (power splitter network), simplify control lines, and provide optional attenuators for further side lobe reduction. Alternatively, the beamformer IC 200 can be expanded to M phase shifters, a 1 to M power splitter, and M attenuators to provide $2^{M*N}$ different phase combinations.

Figure 3:
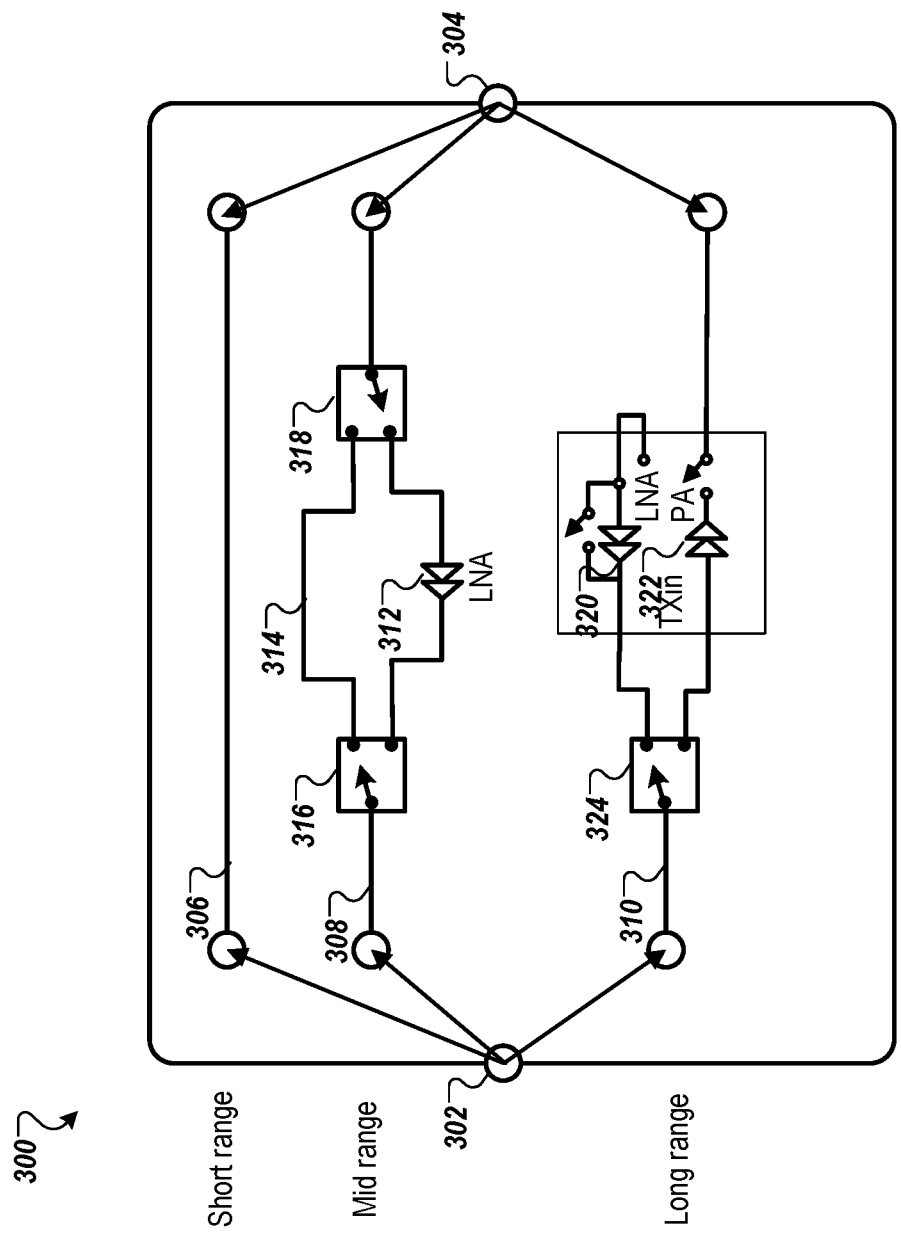
FIG. 3 is a schematic diagram of a radio frequency (RF) module according to one embodiment.

FIG. 3 is a schematic diagram of a RF module 300 according to one embodiment. The RF module 300 can be considered a front-end module or radio frequency front-end (RFFE) circuitry. The RF module 300 can be used for balancing performance and cost. In some cases, where the wireless links are expected to be a short distance, the RF module 300 may not be used at all and the RF port is coupled directly to an antenna element (e.g., referred to as a short-circuit path. In another embodiment where the RF module 300 is coupled between an RF port 302 of the beamformer IC 200 and an antenna element 304 of an antenna array, the short range scenario can be accommodated with a short-circuit path 306, illustrated in FIG. 3

In addition to the short-circuit path 306, the RF module 300 can provide a second path 308 for mid-range distances, and a third path 310 for long-range distances. The second path 308 includes a first LNA 312 for a receive (RX) mode of a radio and a second short-circuit path 314 for a transmit (TX) mode of the radio. The switches 316 and 318 are used to switch between the first LNA 312 in the RX mode and the short-circuit path 314 in the TX mode. The third path includes a second LNA 320 for the RX mode and a PA 322 for the TX mode. The switch 324 is used to switch between the second LNA 320 for the RX mode and the PA 322 for the TX mode. During operation, the digital controller can send a first distance classifier, a second distance classifier, or a third distance classifier to specify use of one of the first short-circuit path 306, the second path 308, or the third path 310. The distance classifier can specify use of one of the short-circuit path 306, the second path 308, or the third path 310. A distance classifier can be a value (e.g., 0, 1, 2), a description (short range distance, mid-range distance, and long-rang distance), an identifier, or the like.

As described above, the RF module 300 can be used for balancing performance and cost. For the short-range conditions, this is the lowest cost and simplest control as no front-end module is needed or used. The wireless device can still include beamforming capability with interference reduction for the short-range conditions. For the mid-range conditions, the wireless device can still have low power consumption and high sensitivity since the LNA is used for all antenna elements. The wireless device can still include beamforming capability with interference reduction for the mid-range conditions. For the long-range conditions, the wireless device can still have the highest performance, but with higher power, since the LNA and PA in the front-end module are used at each antenna element. The wireless device can still include beamforming capability with interference reduction for the long-range conditions. It should be noted that although illustrated as a single circuit that is. In other embodiments, the individual paths 306, 308, and 310 can be fixed for a particular design. That is, if the wireless device is expected to operate in short-range conditions, no RF module is used. If a wireless device is expected to operate in mid-range or long-range conditions, the RF module 300 with either the second path 308 or the third path 310 is included. In other cases, the RF module 300 includes only the second path 308 and the third path 310 since the second path includes a short-circuit path 316 can be used for short-range conditions.

Figure 4:
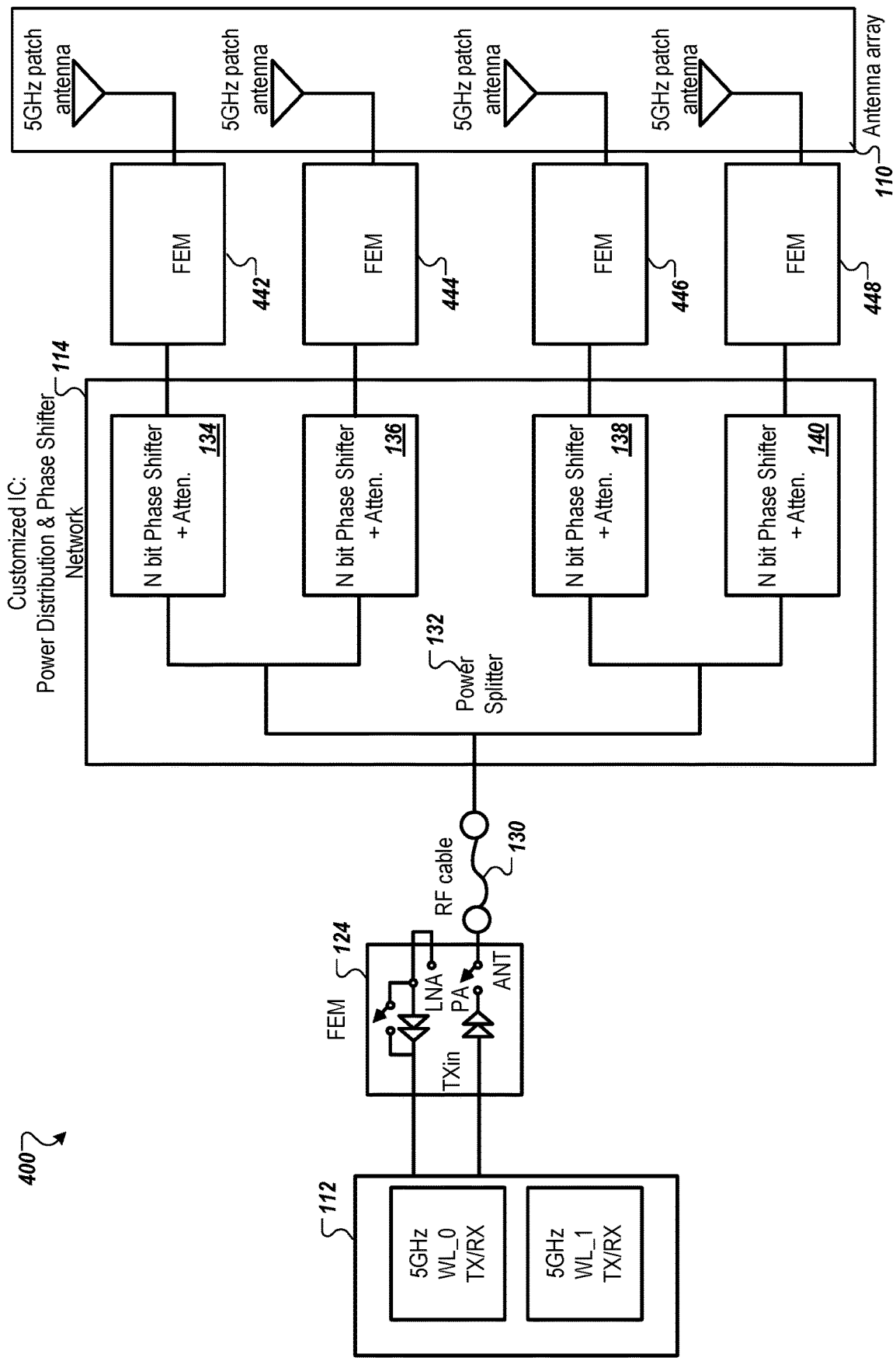
FIG. 4 is a block diagram of a scalable architecture of a wireless device for coordinated dynamic analog beamforming according to another embodiment.

FIG. 4 is a block diagram of a scalable architecture of a wireless device 400 for coordinated dynamic analog beamforming according to another embodiment. The wireless device 400 is similar to the wireless device 100 of FIG. 1, as noted by the same reference labels. In the wireless device 400 uses a FEM instead of a RF module after the beamforming network. The FEM after the beamforming network can be used to recover from losses, such as the EIRP and EIS losses caused by the first RF cable 130 and the beamforming network of the first beamformer circuit 114. The FEM can include a power amplifier and a LNA to add gain to the channels to recover loss caused by the RF cable 130 and the beamforming network. For example, the RF cable 130 can lose up to 20 dB and the beamforming network loss can be between 3 to 10 dB. It should be noted that the first MIMO chain 124 can be a first FEM before the RF cable 130 and the beamforming network and the FEM can be a second FEM for each of the respective channels.

As illustrated, first FEM 442 is coupled between the first attenuator and phase shifter 134 of the first beamformer circuit 114 and the first element of the first antenna array 110. A second FEM 444 is coupled between the second attenuator and phase shifter 136 of the first beamformer circuit 114 and the second element of the first antenna array 110. A third FEM 446 is coupled between the third attenuator and phase shifter 138 of the first beamformer circuit 114 and the third element of the first antenna array 110. A fourth FEM 448 is coupled between the fourth attenuator and phase shifter 140 of the first beamformer circuit 114 and the fourth element of the first antenna array 110.

Although not illustrated, similar FEMs can be used for the second beamformer circuit 116 described with respect to FIG. 1 as well.

Figure 5:
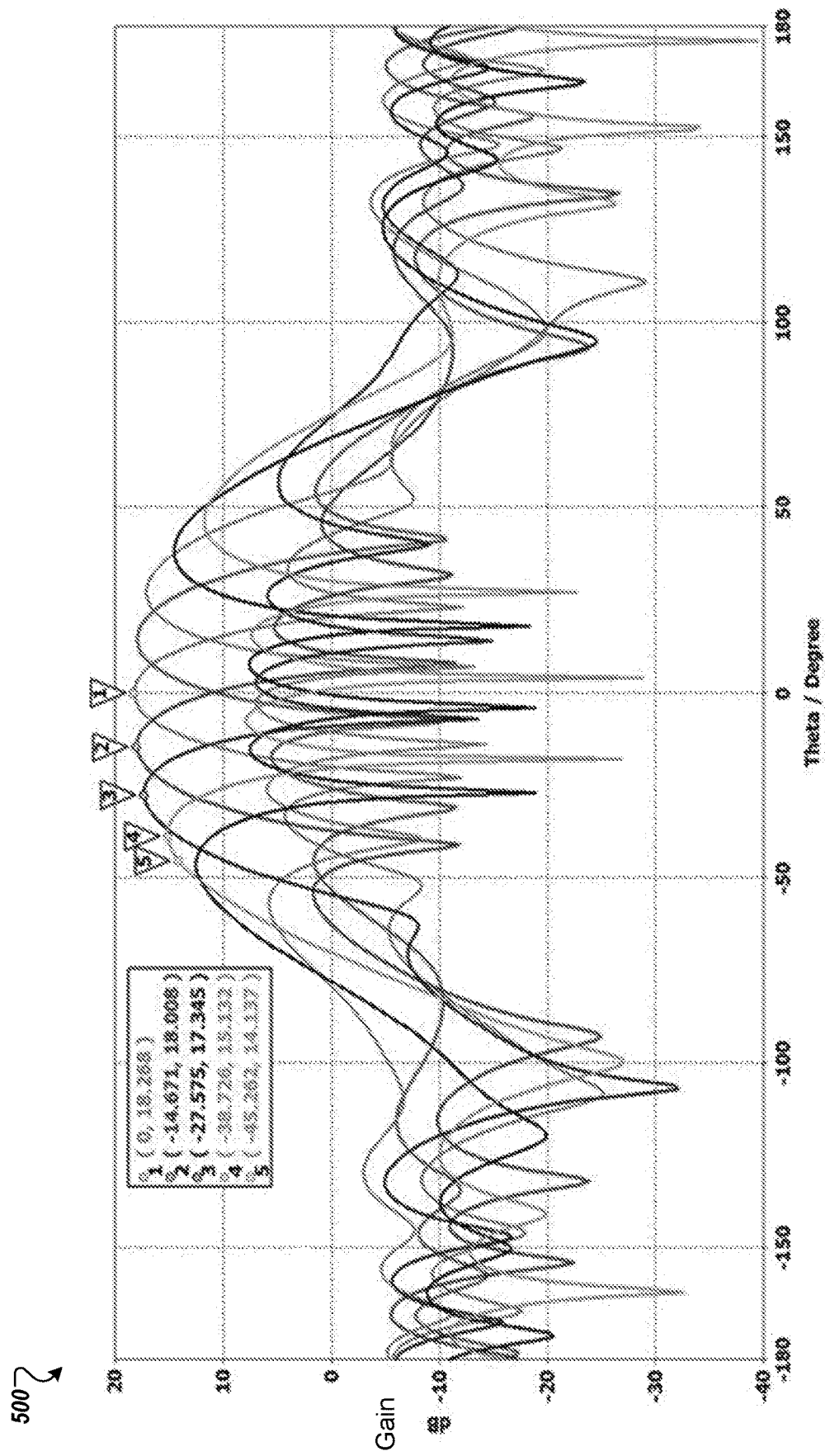
FIG. 5 is a graph illustrating beam-steering with different phase status according to one embodiment.

FIG. 5 is a graph 500 illustrating beam-steering with different phase status according to one embodiment. The graph 500 shows beam-steering at a first angle 502, zero degrees as a first phase status. At the first angle 502, there is a main lobe that peaks at approximately 18.268 dB, as well as side lobes that are 5 dB or less. As described herein, the phase status can be controlled to different angles. As illustrated in FIG. 5, the beam-steering can be adjusted plus or minus 45 degrees with a 4 dB gain reduction. As illustrated, at a second angle 504, approximately −14.671 degrees, there is a main lobe that peaks at approximately 18.008 dB. At a third angle 506, approximately −27.575 degrees, there is a main lobe that peaks at approximately 17.345 dB. At a fourth angle 508, approximately −38.726 degrees, there is a main lobe that peaks at approximately 15.132 dB. At a fifth angle angle 510, approximately −45.262 degrees, there is a main lobe that peaks at approximately 14.137 dB. There is approximately 4 dB gain reduction between the first angle 502 and the fifth angle 510. Although note labeled, similar results can be found for positive angles up to positive 45 degrees.

Figure 6B:
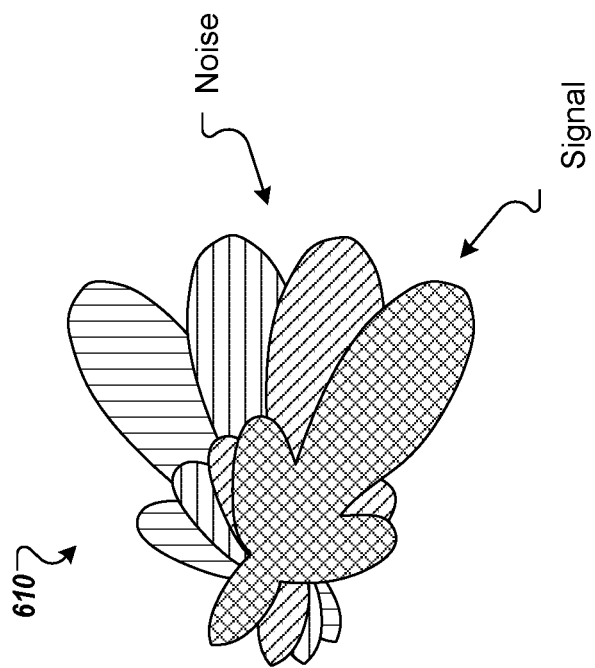
FIG. 6B illustrates a pencil-beam radiation pattern according to one implementation.
Figure 6A:
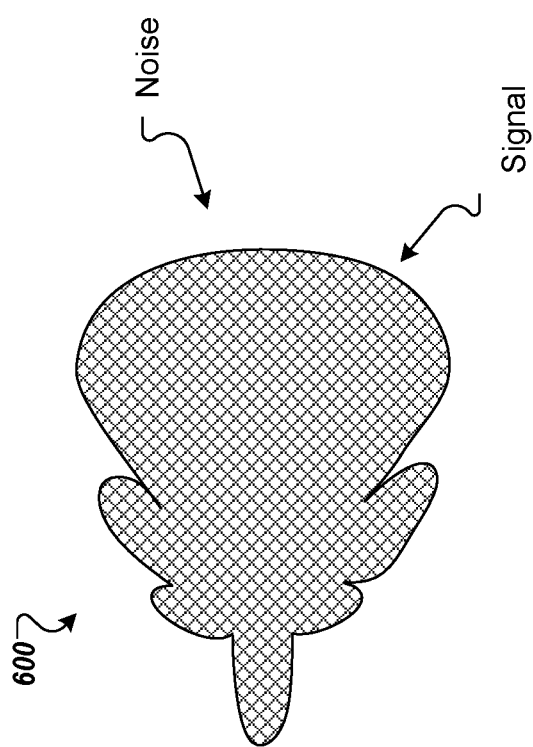
FIG. 6A illustrates a fan-beam radiation pattern according to one implementation.

FIG. 6A illustrates a fan-beam radiation pattern 600 according to one implementation. FIG. 6B illustrates a pencil-beam radiation pattern 620 according to one implementation. As illustrated in FIGS. 6A-6B, the pencil-beam radiation pattern 620 has the same coverage, but lower interference because of a sharper beam width for the signal.

Antenna alignment between a base station node (BSN) and a relay node (RLN) is difficult and time consuming. A "node" is a logical network building block that is subdivided into "infrastructure" (e.g., BSNs, RLNs, or the like) and "customer premises equipment (CPE)." A BSN can be a node of one or more devices that are programmed to connect to an Internet Service Provider (ISP) ingress, such as via a router device, and provide coverage to other downstream devices, such as BS coverage to one or more RLNs and/or gateway coverage to one or more CPE nodes. An RLN can be a node of one or more devices that are programmed to connect to a BSN and provide gateway coverage to one or more CPEs. A CPE can be a node of one or more customer stations that are programmed to provide one or more access points for one or more endpoint devices at a customer premises. The BS coverage and the gateway coverage can be wireless services that provide backhaul for the wireless network, whereas the CPEs provide wireless service as APs in the wireless network. Each node can include one or more wireless network devices, one or more storage devices, and a network switch that connects each of the devices when there are multiple devices in the node. In some cases, the BSN includes a BS device that performs the BS functionality and a gateway device that performs the gateway functionality for any connected CPEs. Similarly, the RLN includes a RL device that performs the RL functionality and a gateway device that performs the gateway functionality for any connected CPEs. Alternatively, the BSN can include a single device, referred to as a BS device. Similarly, the RLN can include a single device, referred to as RL device. Aspects of the present disclosure overcome the deficiencies of both the digital analog beamformers and conventional analog beamformers by providing a coordinated dynamic analog beamformer. The coordinated dynamic analog beamformer dynamically adjusts a per-packet analog beam using the analog beamformer hardware (as described above with respect to FIGS. 1-6B) and a dynamic neighbor lookup database and web-based coordination (e.g., a cloud coordinator service) as described below with respect to FIGS. 7-15.

Figure 7:
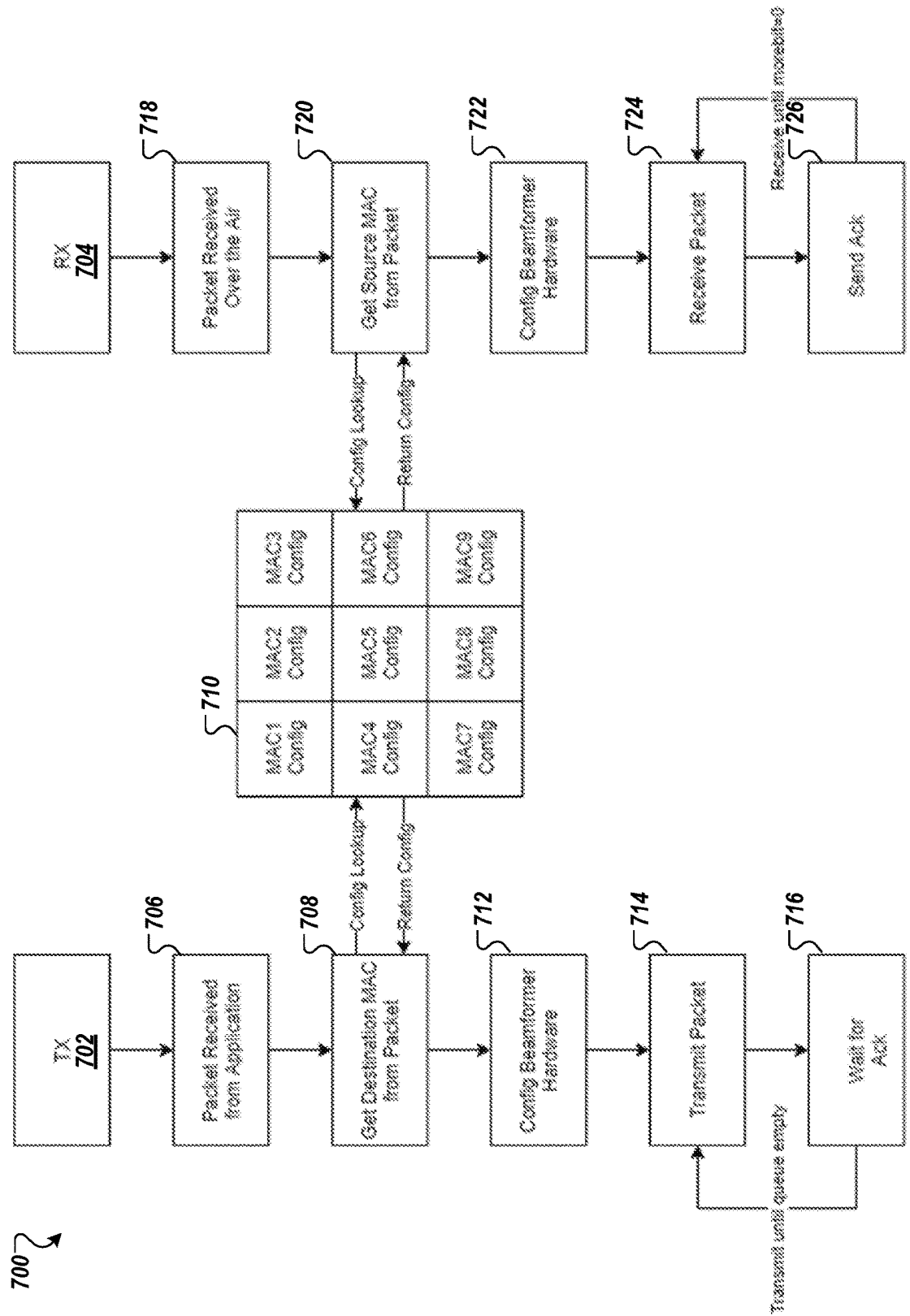
FIG. 7 is a functional diagram of a transmit (TX) radio and a receive (RX) radio for coordinated dynamic analog beamforming using a neighbor lookup database according to one embodiment.

FIG. 7 is a functional diagram of a functional flow 700 of a TX radio and a RX radio for coordinated dynamic analog beamforming using a neighbor lookup database according to one embodiment. Alternatively, the TX radio can be referred to as a first node or Node A and the RX radio can be referred to as a second node or Node B. During operation, the first node is put in a TX mode (block 702) and the second node is put in a RX mode (block 704). The TX radio receives a packet from an application to send to the RX radio at the second node (block 706). The TX radio obtains a destination address (e.g., destination media access control (MAC) from the packet (block 708). The TX radio performs a lookup in a neighbor lookup database 710 to retrieve beamformer configuration data associated with the destination address. The TX radio configures the beamformer hardware, such as described above with respect to FIGS. 1-6, according to the beamformer configuration data retrieved from the neighbor lookup database 710 (block 712). The neighbor lookup database 710 can include an entry for each neighboring device that is detected by the first node. The entries can be indexed by the MAC addresses or other destination identifying information. The beamformer configuration data can include a phase shifter angle value, an attenuation value, an amplifier classifier, or any combination thereof. The beamformer configuration data can be used to control the first beamformer circuit 114 (or 116) described above with respect to FIG. 1. After configuring the beamformer hardware at block 712, the TX radio sends the packet (block 714). The TX radio can wait for an acknowledgment (ACK) from the second node (block 716). The TX radio can send until a queue is empty, returning back to block 714.

On the second node, the RX radio is put into the RX mode (block 704). The RX radio receives a packet over the air (block 718). The RX radio obtains a source address (e.g., source MAC) from the packet (block 720). The RX radio performs a lookup in a neighbor lookup database 710 to retrieve beamformer configuration data associated with the source address. The RX radio configures the beamformer hardware, such as described above with respect to FIGS. 1-6, according to the beamformer configuration data retrieved from the neighbor lookup database 710 (block 722). The RX radio processes the received packet (block 724) and can send an ACK to the first node (block 726). The RX radio can continue to receive data until there is no additional data in the packet being received (e.g., morebit=0 (false)).

The neighbor lookup database 710 can be used to arbitrate the beamformer for each packet exchange session with its neighbor. Additional details and examples of the neighbor lookup database 710 are described below.

In one embodiment, the neighbor lookup database 710 can include three parts, a Neighbor SNR Matrix Table, an Optimal Selection Table, and a Multicast Group Table. The Neighbor SNR Matrix Table can include a beamformer phase shifter angle value, an attenuation value, an amplifier classifier, channel configuration to Signal-to-noise (SNR) matrix for each of the beamformer's neighbors, or any combination thereof. The Optimal Selection Table can include the optimal configuration for each of the beamformer's neighbors. For each neighbor, the Neighbor Lookup Database stores a received signal strength indicator (RSSI) value measured for each antenna sector, phase shifter angle value, attenuator, and amplifier classifier.

Upon receiving a packet from the application to transmit, an Optimal Selection Table is used to look up and configure the optimal beamformer configuration for the designated MAC address. Each packet is tagged with the optimal beamformer configuration for that destination. In the case where multiple packets for multiple destinations are queued by the application, each packet is tagged with the optimal beamformer configuration for that destination. The Multicast Group Table is used when transmitting multicast packets to multiple neighbors at the same time.

Upon receiving a packet over the air, the Optimal Selection Table is used to look up and configure the optimal beamformer configuration according to the source MAC address of the packet.

Figure 8:
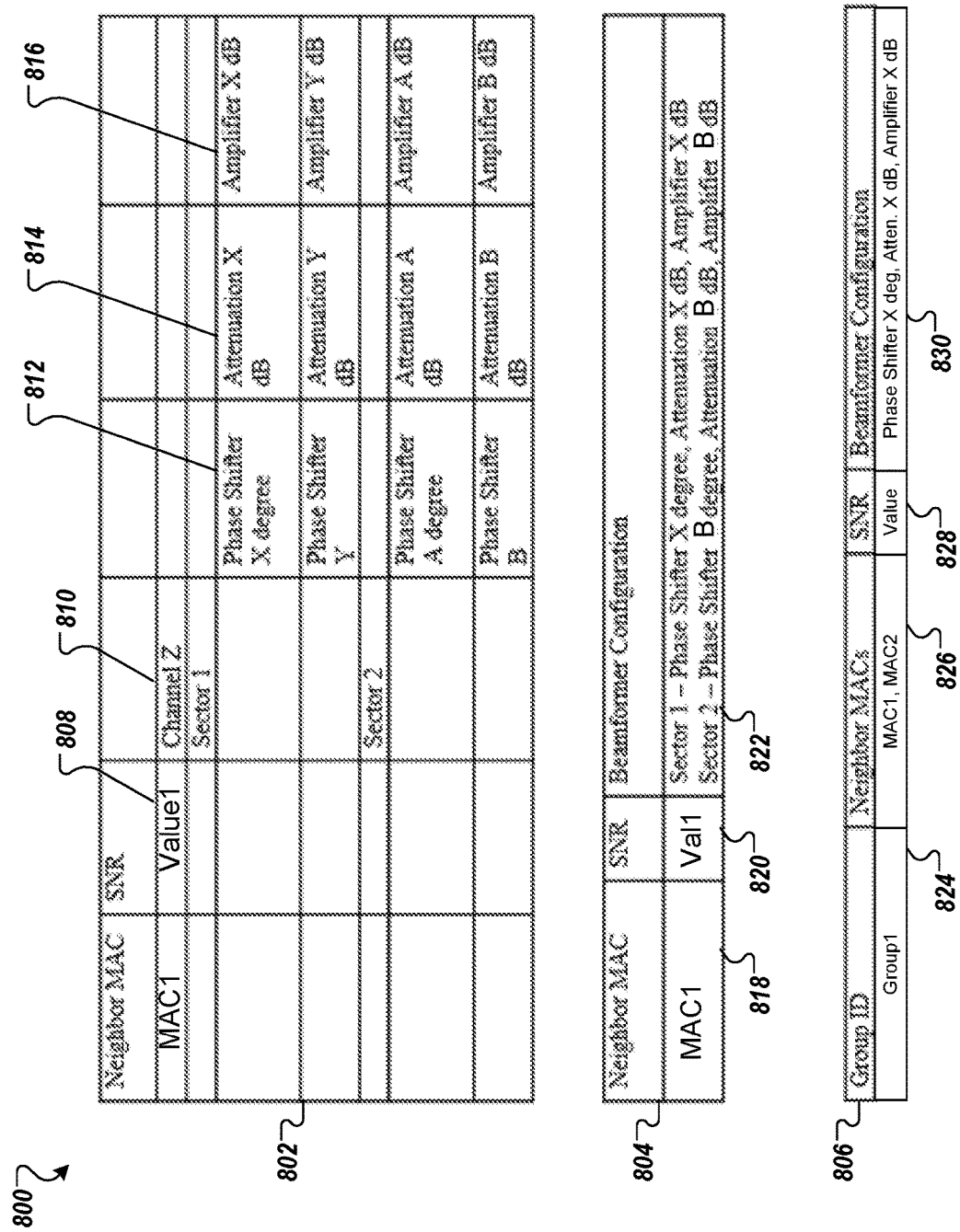
FIG. 8 illustrates an example neighbor lookup database with a neighbor signal-to-noise (SNR) matrix table, an optimal selection table, and a multicast group table according to one embodiment.

FIG. 8 illustrates an example neighbor lookup database 800 with a neighbor signal-to-noise (SNR) matrix table 802, an optimal selection table 804, and a multicast group table 806 according to one embodiment. The neighbor SNR matrix table 802 can include an entry for each neighbor MAC. The entry includes an SNR value 808 for the neighbor MAC. The entry also includes for each channel identifier (e.g., Channel Z) 810 and a set of configuration settings for each sector, such as sectors 1 and 2 illustrated in FIG. 8. The first set of configuration settings includes a phase shifter angle value 812 (X degree), an attenuation classifier 814 (e.g., X dB), and an amplifier classifier 816 (e.g., X dB). The sectors 1 and 2 can correspond to separate antenna arrays. Alternatively, the sectors 1 and 2 can correspond to different antennas of the wireless device. As noted in the example, the sectors 1 and 2 can include different configuration settings for the phase shifter angle value, attenuation value, and amplifier classifier.

The data in the neighbor SNR matrix table 802 can be used to derive the optimal selection table 804, which includes an optimal set of beamformer configuration for the particular neighbor MAC. The optimal selection table 804 includes one or more entries and each entry includes a MAC identifier 818, a SNR value 820, and beamformer configuration data 822 associated with the particular MAC.

The data in the neighbor SNR matrix table 802 can be used to derive the multicast group table 806 when sending packets via multicast. The multicast group table 806 can include optimal beamformer configuration data 830 for a group of MACs. The multicast group table 806 can include an entry with a group identifier 824, MAC identifiers 826 within the group, a SNR value 828, and the optimal beamformer configuration data 830 associated with the group of MACs.

The data in the neighbor SNR matrix table 802 can be collected with the help of a cloud coordinator, such as described below with respect to FIG. 9. In particular, the purpose of the cloud coordinator is to propagate the neighbor information and populate the neighbor SNR matrix table 802. The cloud coordinator can use a combination of scan list from each of the nodes, GPS location of the nodes, and predefined node placements to identify neighbors for each node. The cloud coordinate creates the neighbor SNR matrix table. Once the neighbor SNR matrix table is created, the Cloud Coordinator sends the Training Start Period in UTC time, the Training Period, and Configurations to be trained to each pair of nodes in the network to perform neighbor discovery training to populate the neighbor SNR matrix table and can derive the optimal selection table 804 or allow each node to derive the optimal selection table 804.

The neighbor information is then passed down to each node to create the neighbor SNR matrix table 802, the optimal selection table 804, and/or the multicast group table 806. That is, each node can store its own version (or a portion) of the neighbor lookup database 800, such as described above with the TX radio and the RX radio checking the database for the destination MAC and the source MAC, respectively, as described above with respect to FIG. 7. The cloud coordinator can send the neighbor SNR matrix table to each of the nodes and the nodes can derive the optimal section table.

Figure 9:
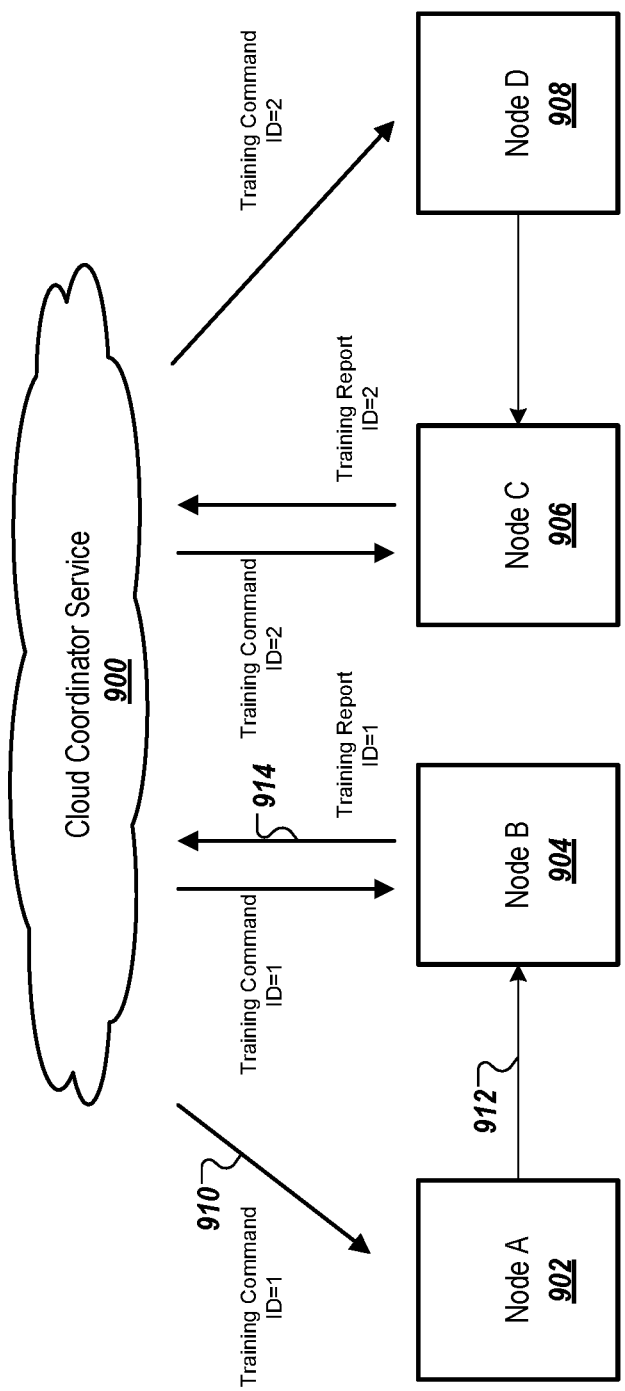
FIG. 9 is a network diagram of a cloud coordinator service and multiple nodes for populating a neighbor SNR matrix table according to one embodiment.

FIG. 9 is a network diagram of a cloud coordinator service 900 and multiple nodes 902-908 for populating a neighbor SNR matrix table according to one embodiment. The cloud coordinator service 900 can be implemented as processing logic comprising hardware, software, firmware, or any combination thereof at one or more servers of a cloud computing system. The cloud coordinator service 900 can collect information for the neighbor SNR matrix table (e.g., 802) by first collecting a scan list from each of the nodes 902-908. The cloud coordinator service 900 can also collect additional information, such as global positioning system (GPS) coordinates of the node, predefined node placements of nodes, or the like. This information can be used to identify neighbors for each node. The cloud coordinator service 900 can send a training command 910 to a first node 902. The training command 910 can include a first identifier for identifying the results of the training. The training command 910 can cause the first node 902 to send training data 912 to a second node 904. The cloud coordinator service 900 can also send the training command 910 to the second node 904 so that it can expect the training data 912 from the first node 902. The second node 904 receives the training data 912 and sends a training report 914 to the cloud coordinator service 900. The training report 914 can include the first identifier. The cloud coordinator service 900 can send a training command 916 to a third node 906. The training command 916 can include a second identifier for identifying the results of the training. The training command 916 can cause the third node 906 to send training data 918 to a fourth node 908. The cloud coordinator service 900 can also send the training command 916 to the fourth node 908 so that it can expect the training data 918 from the third node 906. The fourth node 908 receives the training data 918 and sends a training report 920 to the cloud coordinator service 900. The training report 920 can include the second identifier. The cloud coordinator service 900 can use the training reports 914 and 920 to populate the neighbor SNR matrix table. The cloud coordinator service 900 can continue the training for other pairs of nodes to populate the neighbor SNR matrix table.

In one embodiment, the cloud coordinator service 900 sends a Training Start Period in UTC time, a Training Period, and Configurations to be trained to each pair of nodes in the network to perform neighbor discovery training to populate the neighbor SNR matrix table. Once the neighbor SNR matrix table is populated at the cloud coordinator service 900, the neighbor information is then passed down to each node to create the neighbor SNR matrix table or a copy of the neighbor SNR matrix table is sent to each node. The cloud coordinator service 900 can derive the optimal selection table or can instruct the nodes to create the optimal section tables at the respective nodes.

In another embodiment, the cloud coordinator service 900 can populate the multicast group table, and the cloud coordinator service 900 creates logical groups neighbor permutations. For example, if Node A has two neighbors Node B and C. The multicast group table would include four groups, ABC, AB, AC, and BC. The cloud coordinator service 900 initiates the SNR training for all groups in the multicast group table. The receiver of the multicast frames from each of the training session propagates the SNR report to the cloud coordinator service 900.

FIG. 10A illustrates an example training command 1000 according to one embodiment. The example training command 1000 can include the following fields: a command identifier (ID) field 1002, a source MAC field 1004, a destination MAC field 1006, a channel field 1008, a configuration field 1010, a start timestamp field 1012, a countdown period field 1014, a training period field 1016, and a mode field 1018. The command ID field 1002 can include a command identifier that identifies the training command for identifying the corresponding results. The source MAC field 1004 can include an identifier that identifies a transmitting device, such as the MAC of the device that is transmitting the data packet. The destination MAC field 1006 can include an identifier that identifies a receiving device, such as the MAC of the device that is to receive the data packet. The channel field 1008 can include an identifier that identifies a channel being used to send the data packet. The configuration field 1010 can include text that describes one or more configuration settings being used for the training data being sent. The configuration field 1010 can specify the phase shifter angle value, the attenuation value, the amplifier classifier, etc. for each of the sectors. The start timestamp field 1012 can include a timestamp (value) that identifies a time when the training should start. The countdown period field 1014 can include a value that represents an amount of time before the training period to ensure that the medium is not busy. The training period field 1016 can include a value that represents an amount of time for the training period. The mode field 1018 can include an identifier that identifies whether the command is to transmit training data or receive training data. For example, a first node receives the example training command 1000 with the command identifier, ID=1, in the command identifier field 1002 and a TX set in the mode field 1018, whereas a second node receives the example training command 1000 with the same command identifier, ID=1, in the command identifier field 1002 and a RX set in the mode field 1018.

FIG. 10B illustrates an example SNR report 1020 according to one embodiment. The example SNR report 1020 can include the following fields: a command ID field 1022, a source MAC field 1024, a destination MAC field 1026, a channel field 1028, a configuration field 1030, and an SNR field 1032. The command ID field 1022 can include a command identifier that identifies the training command for the included SNR results. The source MAC field 1024 can include an identifier that identifies a transmitting device, such as the MAC of the device that is transmitting the data packet. The destination MAC field 1026 can include an identifier that identifies a receiving device, such as the MAC of the device that is to receive the data packet. The channel field 1028 can include an identifier that identifies a channel being used to send the data packet. The configuration field 1030 can include text that describes one or more configuration settings being used for the training data being received. The SNR field 1032 can include a value that represents a SNR value measured for the training data. The SNR value can be an RSSI value. The example SNR report 1020 of each training period is sent back to the cloud coordinator service 900 to populate the neighbor SNR matrix table, as described herein.

FIG. 10C is a timing diagram 1040 of two training periods to train each pair of nodes to perform neighbor discovery training to populate a neighbor SNR matrix table according to one embodiment. A node A 1042 receives a training command that specifies a first training period 1046 that starts at a first timestamp 1048 after a first countdown period 1050. A node B 1044 receives a training command that specifies the first training period 1046 that starts at the first timestamp 1048 after the first countdown period 1050. The node A 1042 also receives a training command that specifies a second training period 1052 that starts at a second timestamp 1054 after a second countdown period 1056. The node B 1044 also receives a training command that specifies the second training period 1052 that starts at the second timestamp 1054 after the second countdown period 1056. During the first training period 1046, the node A 1042 can transmit a data packet, such as illustrated and described below with respect to FIG. 10D.

FIG. 10D illustrates an example packet format 1060 of a data packet with beamformer configuration information according to one embodiment. The data packet can include the following fields: a source MAC field 1062, a destination MAC field 1064, a payload field 1066, and a beamformer configuration field 1068. The source MAC field 1062 can include an identifier that identifies node A 1042, such as the MAC of the device that is transmitting the data packet. The destination MAC field 1064 can include an identifier that identifies the node B 1044, such as the MAC of the device that is to receive the data packet. The payload field 1066 can include a data payload being sent. The data payload can be training data or dummy data. The beamformer configuration field 1068 can include the beamformer configuration data being used to transmit the data packet.

Figure 11:
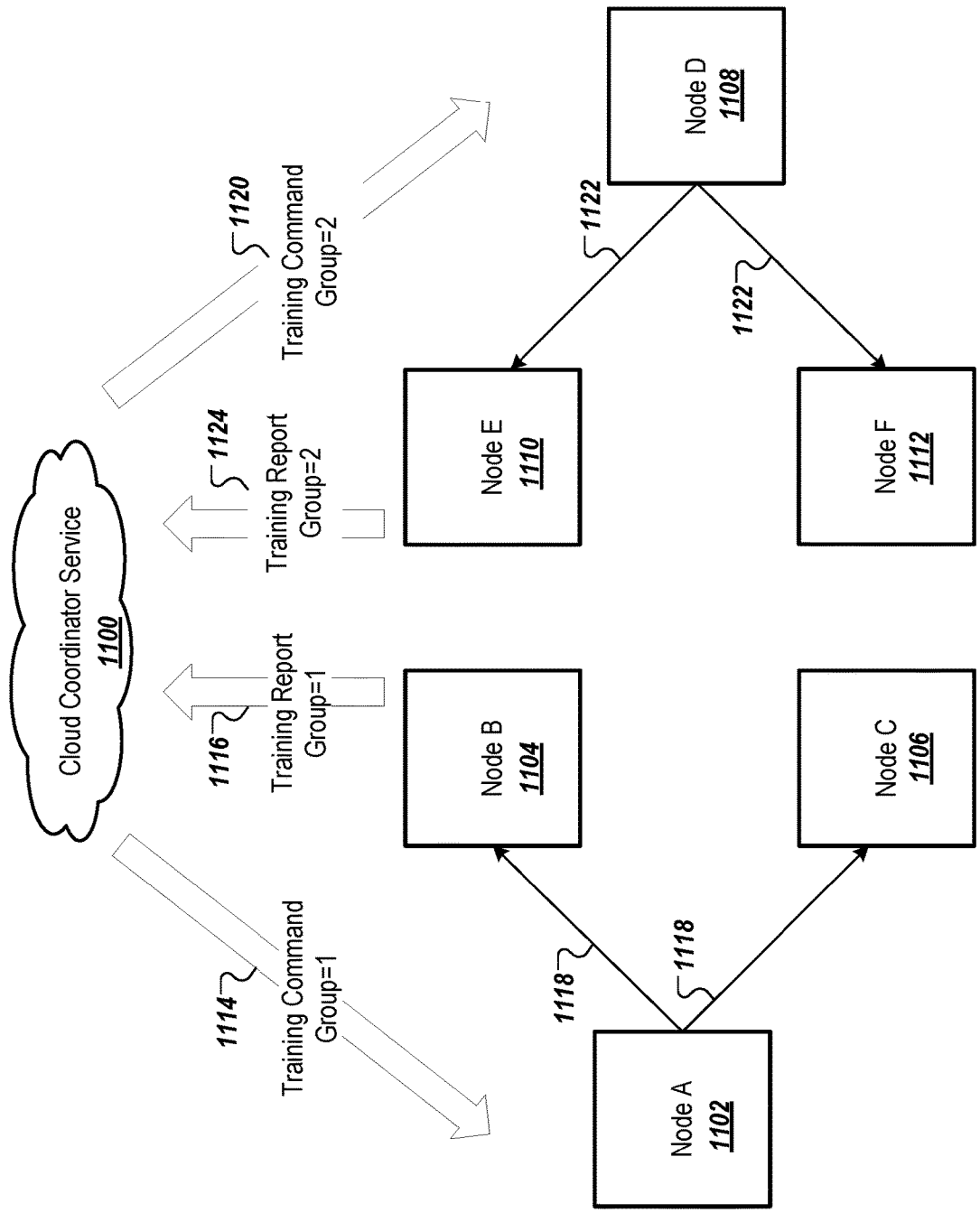
FIG. 11 is a network diagram of a cloud coordinator service and multiple nodes for populating a multicast group table according to one embodiment.

FIG. 11 is a network diagram of a cloud coordinator service 1100 and multiple nodes for populating a multicast group table according to one embodiment. The cloud coordinator service 1100 can be implemented as processing logic comprising hardware, software, firmware, or any combination thereof at one or more servers of a cloud computing system. The cloud coordinator service 1100 can collect information for the neighbor SNR matrix table (e.g., 802) by first collecting a scan list from each of the nodes 902-908. The cloud coordinator service 900 can also collect additional information, such as global positioning system (GPS) coordinates of the node, predefined node placements of nodes, or the like. This information can be used to identify neighbors for each node.

In one embodiment, to populate the multicast group table, the cloud coordinator service 1100 creates logical groups neighbor permutations. For example, if Node A 1102 has two neighbors a second node 1104 (Node B) and a third node 1106 (Node C). The multicast group table would include four groups: ABC, AB, AC, and BC. The cloud coordinator service 1100 initiates the SNR training for all groups in the multicast group table by sending a training command 1114 to at least the Node A 1102, but could also send the training command 1114 to the second node 1104 (Node B) and the third node 1106 (Node C). The receivers of the multicast frames from each of the training session sends a training report 1116 (SNR report) to the cloud coordinator service 1100. The training command 1114 can include a first identifier (group 1) for identifying the results of the training. The training command 1114 can cause the first node 1102 to send training data 1118 to the second node 1104 and third node 1106. The cloud coordinator service 1100 can also send the training command 1114 to the second node 1104 and the third node 1106 so that it can expect the training data 1118 from the first node 1102. The second node 1104 receives the training data 1118 and sends the training report 1116 to the cloud coordinator service 1100. The training report 1116 can include the first identifier (group 1). It should be noted that the training report 1116 can be individual reports from the respective nodes or an aggregate training report if and when the second node 1104 and third node 1106 exchange information. It should also be noted that group 1 can include more nodes than the second node 1104 and the third node 1106.

The cloud coordinator service 1100 can send a training command 1120 to a fourth node 1108. The training command 1120 can include a second identifier (group 2) for identifying the results of the training. The training command 1120 can cause the fourth node 1108 to send training data 1122 to a fifth node 1110 and a sixth node 1112. The cloud coordinator service 1100 can also send the training command 1120 to the fifth node 1110 and the sixth node 1112 so that it can expect the training data 1122 from the fourth node 1108. The fifth node 1110 and the sixth node 1112 receive the training data 1122 and send a training report 1124 to the cloud coordinator service 1100. The training report 1124 can include the second identifier (group 2). The training report 1124 can be individual reports from the respective nodes. It should also be noted that group 2 can include more nodes than the fifth node 1110 and the sixth node 1112. The cloud coordinator service 1100 can use the training reports 1116 and 1124 to populate the neighbor SNR matrix table. The cloud coordinator service 1100 can continue the training for other pairs of nodes to populate the neighbor SNR matrix table.

As described herein, the training process can be sped up by known information, such as GPS coordinates, distances, or angles from deploying the wireless device in known locations. In addition to sharing GPS coordinates for determining distances and angles, Round Trip Time (RTT) measurements can be used from each node to derive the distance and angle between nodes, such as described below with respect to FIG. 12.

Figure 12:
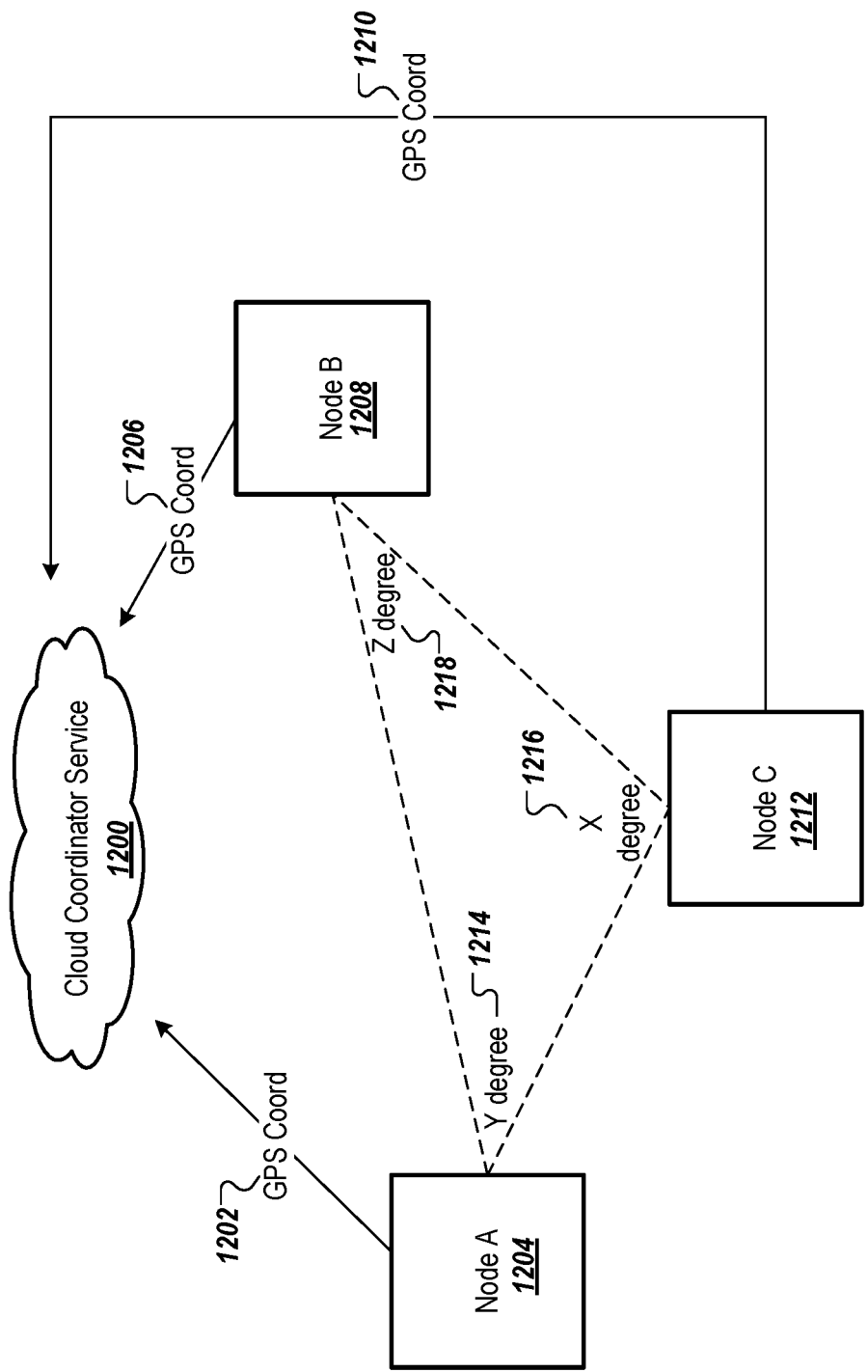
FIG. 12 is a network diagram of a cloud coordinator service and multiple nodes for determining distance and angles between the multiple nodes using GPS coordinates according to one embodiment.
Figure 13:
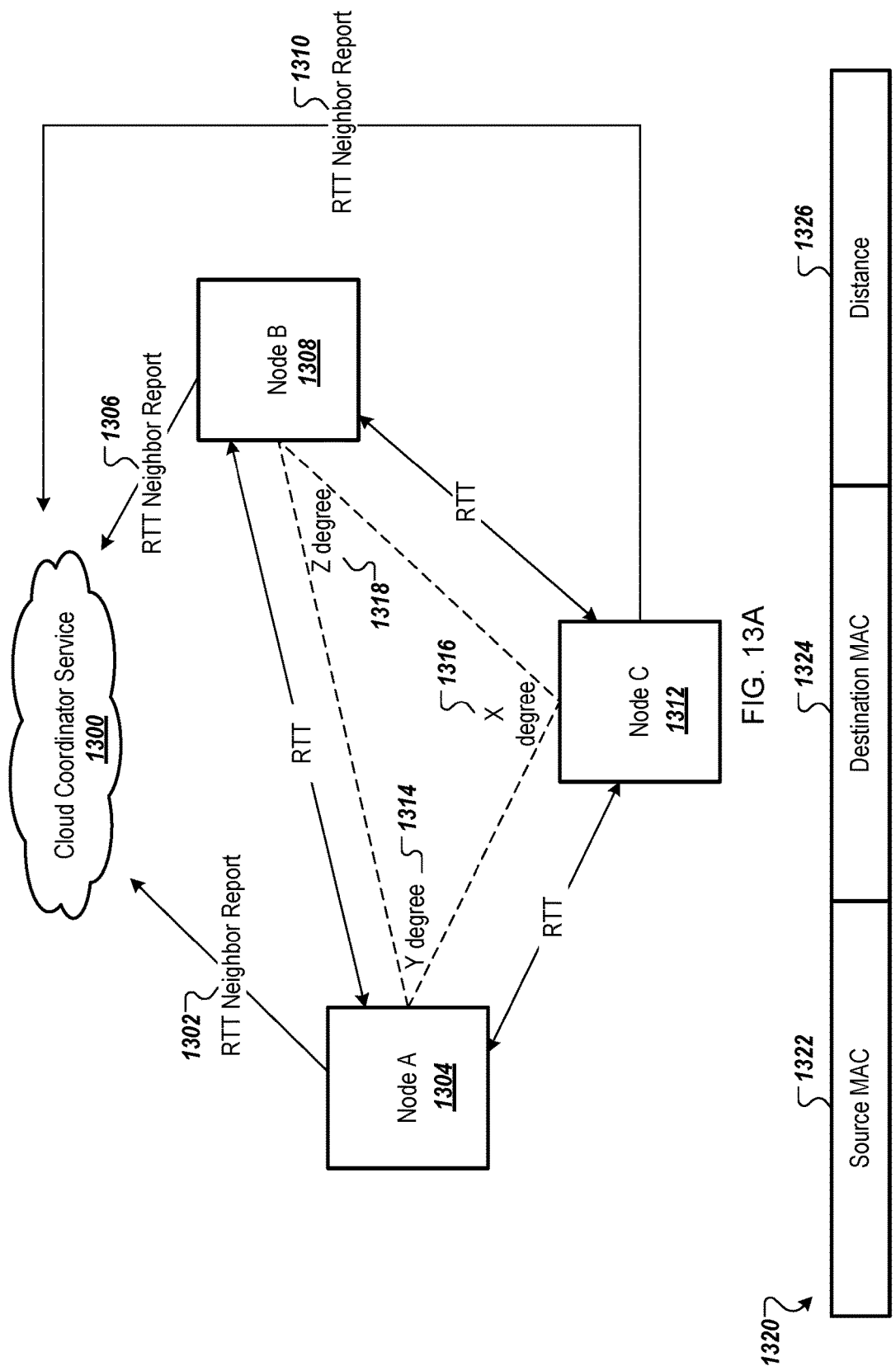
FIG. 13A is a network diagram of a cloud coordinator service and multiple nodes for determining distance and angles between the multiple nodes using round trip time (RTT) measurements according to one embodiment.
FIG. 13B illustrates an example RTT neighbor report according to one embodiment.

FIG. 12 is a network diagram of a cloud coordinator service 1200 and multiple nodes for determining distance and angles between the multiple nodes using GPS coordinates according to one embodiment. The cloud coordinator service 1200 can be implemented as processing logic comprising hardware, software, firmware, or any combination thereof at one or more servers of a cloud computing system. The cloud coordinator service 1200 can collect first GPS coordinates 1202 from a first node 1204, second GPS coordinates 1206 from a second node 1208, and third GPS coordinates 1210 from a third node 1212. The cloud coordinator service 1200 can use the first GPS coordinates 1202, the second GPS coordinates 1206, and the third GPS coordinates 1210 to determine a first angle 1214 (Y degrees), a second angle 1216 (X degree), and a third angle 1218 (Z degree). These angles can be used as a starting put for training the first node 1204, the second node 1208, and the third node 1212 for the optimal configuration data, including phase shifter angle values, attenuation values, amplifier classifiers, or any combination thereof. The cloud coordinator service 1200 can also use the first GPS coordinates 1202, the second GPS coordinates 1206, and the third GPS coordinates 1210 to determine a distance between each pair of nodes.

FIG. 13A is a network diagram of a cloud coordinator service 1300 and multiple nodes for determining distance and angles between the multiple nodes using round trip time (RTT) measurements according to one embodiment. The cloud coordinator service 1300 can be implemented as processing logic comprising hardware, software, firmware, or any combination thereof at one or more servers of a cloud computing system. The cloud coordinator service 1300 can collect a first RTT neighbor report 1302 from a first node 1304, a second RTT neighbor report 1306 from a second node 1308, and a third RTT neighbor report 1310 from a third node 1312. The cloud coordinator service 1300 can use the first RTT neighbor report 1302, the second RTT neighbor report 1306, and the third RTT neighbor report 1310 to determine a first angle 1314 (Y degrees), a second angle 1316 (X degree), and a third angle 1318 (Z degree). These angles can be used as a starting put for training the first node 1304, the second node 1308, and the third node 1312 for the optimal configuration data, including phase shifter angle values, attenuation values, amplifier classifiers, or any combination thereof. The cloud coordinator service 1300 can also use the first RTT neighbor report 1302, the second RTT neighbor report 1306, and the third RTT neighbor report 1310 to determine a distance between each pair of nodes. Alternatively, the nodes themselves can determine a distance between itself and another node and send the value representing the distance in the RTT neighbor report, such as illustrated in FIG. 13B.

FIG. 13B illustrates an example RTT neighbor report 1320 according to one embodiment. The example RTT neighbor report 1320 can include the following fields: a source MAC field 1322, a destination MAC field 1324, and a distance field 1326. The source MAC field 1322 can include an identifier (e.g., MAC) that identifies the node sending the report. The destination MAC field 1324 can include an identifier (e.g., MAC) that identifies the other node. The distance field 1326 can include a value representing the distance between the two nodes. Alternatively, the distance field 1326 includes the RTT value and the cloud coordinator service 1330 determines the distance from the RTT value.

Figure 14:
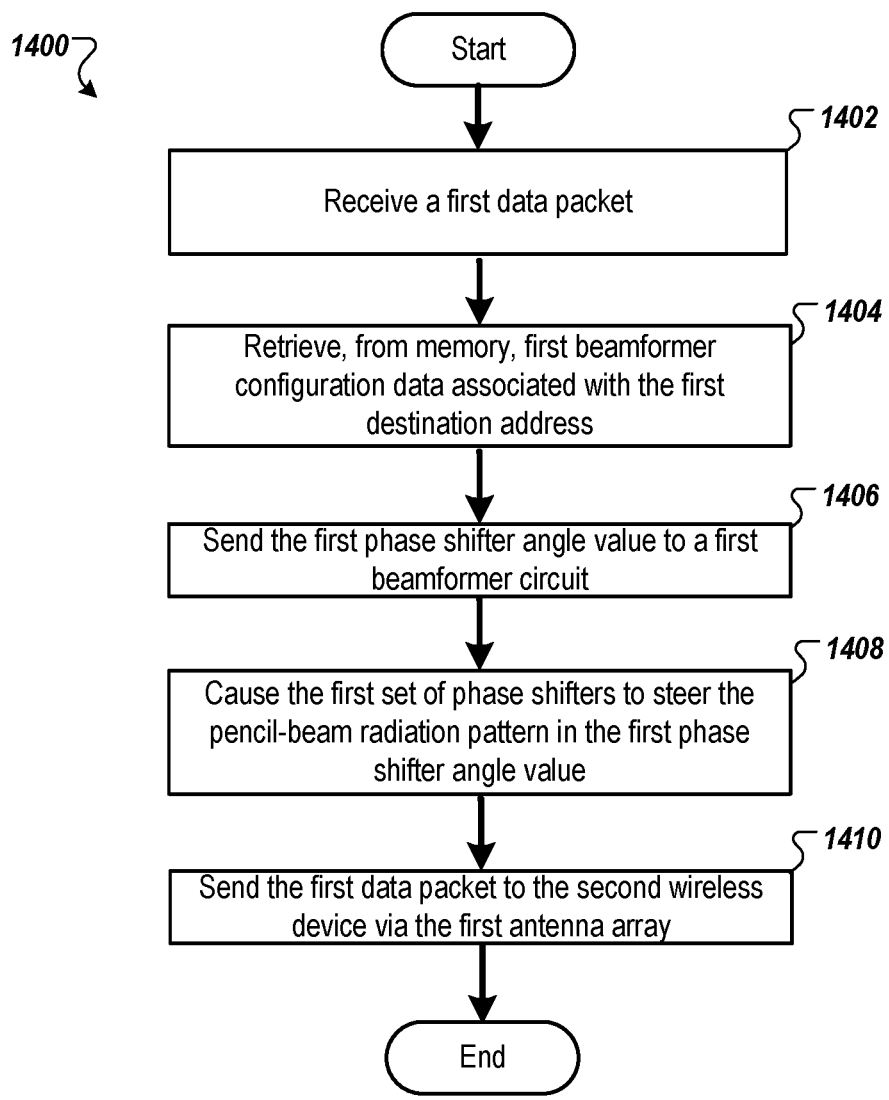
FIG. 14 is a flow diagram of a method of beamsteering a pencil-beam radiation pattern using a beamformer circuit according to one embodiment.

FIG. 14 is a flow diagram of a method of beamsteering a pencil-beam radiation pattern using a beamformer circuit according to one embodiment. The method 1400 may be performed by processing logic that comprises hardware (e.g., circuitry, dedicated logic, programmable logic, microcode, etc.), software, firmware, or a combination thereof. In one embodiment, the method 1400 may be performed by the digital controller 122 of FIG. 1. In another embodiment, the method 1400 may be performed by the digital controller 230 of FIG. 2. In another embodiment, the method 1400 may be performed by the first node of FIG. 7. Alternatively, the method 1400 may be performed by any of the processing device devices described herein and illustrated with respect to FIGS. 1-13.

Referring back to FIG. 14, the method 1400 begins by the processing logic receiving, a first data packet (block 1402). The first data packet includes a first destination address of a second wireless device. The processing logic retrieves, from a memory device, first beamformer configuration data associated with the first destination address (block 1404). The first beamformer configuration data includes a first phase shifter angle value for a pencil-beam radiation pattern. The processing logic sends, to a first beamformer circuit, the first phase shifter angle value (block 1406). The first beamformer circuit includes a first power splitter and a first set of phase shifters. The set include at least four phase shifters. The processing logic causes the first set of phase shifters to steer the pencil-beam radiation pattern of electromagnetic energy, radiated by a first antenna array of elements, at the first phase shifter angle value (block 1408). The processing logic sends the first data packet to the second wireless device via the first antenna array of elements (block 1410); and the method 1400 ends.

In a further embodiment, the first beamformer configuration data also includes a first attenuation value and the first beamformer circuit further includes a first set of attenuators. The first set of attenuators includes an attenuator for each of the at least four phase shifters. That is, each attenuator of the first set of attenuators is coupled to a corresponding phase shifter of the at least four phase shifters. The processing logic sends the first attenuation value to the first set of attenuators and sets the first set of attenuators to the first attenuation value.

In another embodiment, the first beamformer configuration data further includes a first amplifier classifier. The processing logic sends the first amplifier classifier to a first set of RF modules. Each of the first set of RF modules includes an amplifier corresponding to each one of the phase shifters of the first set of phase shifters. In some cases, the RF module includes multiple paths, including a short-circuit path, a path with just an LNA, or a path with both an LNA and a power amplifier. The processing logic sends the first set of RF modules to the first amplifier classifier. This can be the processing logic selecting one of the paths or setting an amplifier classifier of the LNA, the LNA and PA, or any combination thereof.

In another embodiment, a second beamformer circuit can be used and the processing logic sends, to the second beamformer circuit, the first phase shifter angle value, the first attenuation value (or a second attenuation value), the first amplifier classifier (or a second amplifier classifier). The second beamformer circuit includes a second power splitter and a second set of phase shifters. In some cases, the second beamformer circuit includes a second set of attenuators. The second set of attenuators includes an attenuator for each of the phase shifters of the second set of phase shifters. That is, each attenuator of the second set of attenuators is coupled to a corresponding phase shifter of the second set of phase shifters. The processing logic causes the second set of phase shifters to steer the pencil-beam radiation pattern at the first phase shifter angle value and can set the second set of attenuators to the first attenuation value. The processing logic can also set a second set of RF modules according to the first amplifier classifier.

In another embodiment, each of the first set of phase shifters is an N-bit phase shifter, where $2^N$ (i.e., two to the power of N) is a number of phase states of the N-bit phase shifter. The first set of phase shifters can include a number, M, of phase shifters, where M is four or greater. The first set of phase shifters is controlled to operate in one of $2^{(M*N)}$ phase combination to steer the pencil-beam radiation pattern at the first phase shifter angle value.

In a further embodiment, the processing logic receives a second data packet. The second data packet can include a second destination address of a third wireless device. The processing logic retrieves, from the memory device, second beamformer configuration data associated with the second destination address. The second beamformer configuration data includes a second phase shifter angle value for the pencil-beam radiation pattern. The second phase shifter angle value is different than the first phase shifter angle value. The processing logic sends, to the first beamformer circuit, the second phase shifter angle value. The processing logic causes the first set of phase shifters to steer the pencil-beam radiation pattern at the second phase shifter angle value. The processing logic sends the second data packet to the third wireless device via the first antenna array of elements.

In another embodiment, the second beamformer configuration data further include a second attenuation value and a second amplifier classifier. The processing logic sends the second attenuation value to the first set of attenuators and causes the first beamformer configuration to set the first set of attenuators to the second attenuation value. The processing logic sends the second amplifier classifier to a first set RF modules, each including an amplifier. The processing logic causes the first set of RF modules to set the amplifiers to the second amplifier classifier.

In a further embodiment, the first beamformer configuration data further includes a first distance classifier, such a short-range distance classifier, a mid-range distance classifier, or a long-range distance classifier. The first wireless device includes a set of RF modules. Each of the set of RF modules includes a first short-circuit path, a second path including a first LNA for a RX mode and a second short-circuit path for a TX mode of the radio, and a third path including a second LNA for the RX mode and a PA for the TX mode. The processing logic causes the set of RF modules to select one of the first short-circuit path, the second path, or the third path based on the first range distance classifier, the second range distance classifier, or the third range distance classifier.

Figure 15:
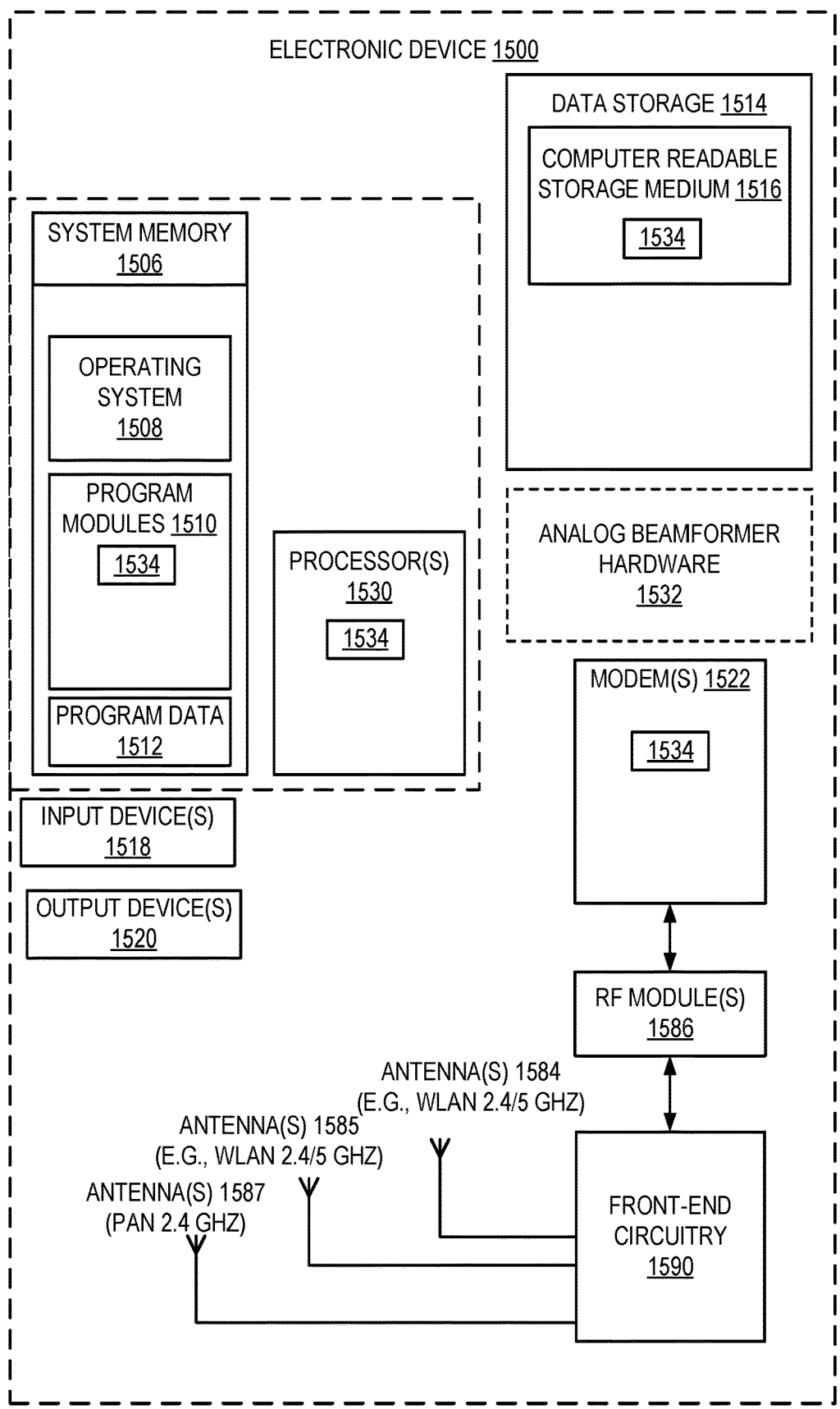
FIG. 15 is a block diagram of an electronic device that can be configured for coordinated dynamic analog beamforming as described herein according to one embodiment.

FIG. 15 is a block diagram of an electronic device 1500 that can be configured for coordinated dynamic analog beamforming as described herein according to one embodiment. The electronic device 1500 may correspond to the electronic devices described above with respect to FIGS. 1-14. In one embodiment, the electronic device 1500 is a remote server that implements the cloud coordinator service, described herein, such as the cloud coordinator service 900 of FIG. 9, 1100 of FIG. 11, 1200 of FIG. 12, or 1300 of FIG. 13A. In another embodiment, the electronic device 1500 includes the analog beamformer hardware 1532. The analog beamformer hardware 1532 can include the circuitry described above with respect to FIGS. 1-6. In a further embodiment, the electronic device 1500 includes coordinated dynamic analog beamforming logic 1534 that performs the coordinated dynamic analog beamforming described herein, such as the functional flow 700 of FIG. 7, the method 1400 of FIG. 14, or any of the operations described herein. The coordinated dynamic analog beamforming logic 1534 can be implemented in the digital controller 122 of FIG. 1 or the digital controller 230 of FIG. 2. In another embodiment, the electronic device 1500 is a controller device for coordinating the coordinated dynamic analog beamforming described herein. The controller device can be a wireless device in the wireless network. The controller device can receive training reports from the various wireless device in the network and determine an optimal selection table for dynamically adjusting the beamformer configuration data on a per-packet basis. Alternatively, the electronic device 1500 may be other electronic devices, as described herein.

The electronic device 1500 includes one or more processor(s) 1530, such as one or more CPUs, microcontrollers, field programmable gate arrays, or other types of processors. The electronic device 1500 also includes system memory 1506, which may correspond to any combination of volatile and/or non-volatile storage mechanisms. The system memory 1506 stores information that provides operating system component 1508, various program modules 1510, program data 1512, and/or other components. In one embodiment, the system memory 1506 stores instructions of methods to control operation of the electronic device 1500. The electronic device 1500 performs functions by using the processor(s) 1530 to execute instructions provided by the system memory 1506. In one embodiment, the program modules 1510 may include coordinated dynamic analog beamforming logic 1534 that may perform some or all of the operations described herein, such as the method 1400 or any combination thereof. The coordinated dynamic analog beamforming logic 1534 may perform some or all of the operations described herein for coordinated dynamic analog beamforming.

The electronic device 1500 also includes a data storage device 1514 that may be composed of one or more types of removable storage and/or one or more types of non-removable storage. The data storage device 1514 includes a computer-readable storage medium 1516 on which is stored one or more sets of instructions embodying any of the methodologies or functions described herein. Instructions for the program modules 1510 (e.g., coordinated dynamic analog beamforming logic 1534) may reside, completely or at least partially, within the computer-readable storage medium 1516, system memory 1506 and/or within the processor(s) 1530 during execution thereof by the electronic device 1500, the system memory 1506 and the processor(s) 1530 also constituting computer-readable media. The electronic device 1500 may also include one or more input devices 1518 (keyboard, mouse device, specialized selection keys, etc.) and one or more output devices 1520 (displays, printers, audio output mechanisms, etc.).

The electronic device 1500 further includes a modem 1522 to allow the electronic device 1500 to communicate via a wireless connections (e.g., such as provided by the wireless communication system) with other computing devices, such as remote computers, an item providing system, and so forth. The modem 1522 can be connected to one or more radio frequency (RF) modules 1586. The RF modules 1586 may be a WLAN module, a WAN module, wireless personal area network (WPAN) module, Global Positioning System (GPS) module, or the like. The antenna structures (antenna(s) 1584, 1585, 1587) are coupled to the front-end circuitry 1590, which is coupled to the modem 1522. The front-end circuitry 1590 may include radio front-end circuitry, antenna switching circuitry, impedance matching circuitry, or the like. The antennas 1584 may be GPS antennas, Near-Field Communication (NFC) antennas, other WAN antennas, WLAN or PAN antennas, or the like. The modem 1522 allows the electronic device 1500 to handle both voice and non-voice communications (such as communications for text messages, multimedia messages, media downloads, web browsing, etc.) with a wireless communication system. The modem 1522 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1xRTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1522 may generate signals and send these signals to antenna(s) 1584 of a first type (e.g., WLAN 5 GHz), antenna(s) 1585 of a second type (e.g., WLAN 2.4 GHz), and/or antenna(s) 1587 of a third type (e.g., WAN), via front-end circuitry 1590, and RF module(s) 1586 as descried herein. Antennas 1584, 1585, 1587 may be configured to transmit in different frequency bands and/or using different wireless communication protocols. The antennas 1584, 1585, 1587 may be directional, omnidirectional, or non-directional antennas. In addition to sending data, antennas 1584, 1585, 1587 may also receive data, which is sent to appropriate RF modules connected to the antennas. One of the antennas 1584, 1585, 1587 may be any combination of the antenna structures described herein.

In one embodiment, the electronic device 1500 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1522 is shown to control transmission and reception via antenna (1584, 1585, 1587), the electronic device 1500 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
   a processor that executes an application;
   a memory device coupled to the processor, the memory device storing beamformer configuration data;
   a first antenna array including a plurality of elements;
   a wireless local area network (WLAN) radio coupled to the processor, wherein the WLAN radio comprises:
   first transceiver circuitry;
   a first multiple-input, multiple-output (MIMO) chain coupled to the first transceiver circuitry; and
   a digital controller that outputs a phase control signal; and
   a first beamformer circuit coupled to the digital controller, the first antenna array, and the first MIMO chain via a first RF cable, wherein the first beamformer circuit comprises:
   a first power splitter coupled to the first RF cable;
   a first attenuator, a second attenuator, a third attenuator, and a fourth attenuator, each coupled to the first power splitter;
   a first phase shifter coupled between the first attenuator and a first element of the first antenna array;
   a second phase shifter coupled between the second attenuator and a second element of the first antenna array;
   a third phase shifter coupled between the third attenuator and a third element of the first antenna array; and
   a fourth phase shifter coupled between the fourth attenuator and a fourth element of the first antenna array, wherein:

the digital controller receives a data packet from the application, the data packet comprising a destination address of a second wireless device;

the digital controller retrieves, from the memory device, the beamformer configuration data associated with the destination address and including a phase shifter angle value for a pencil-beam radiation pattern and a first attenuation value;

the digital controller sends, to the first beamformer circuit, the phase shifter angle value and the first attenuation value;

the first beamformer circuit causes the first phase shifter, the second phase shifter, the third phase shifter, and the fourth phase shifter to steer the pencil-beam radiation pattern, radiated by the first antenna array, at the phase shifter angle value;

the first beamformer circuit sets the first attenuator, the second attenuator, the third attenuator, and the fourth attenuator to the first attenuation value; and the first transceiver circuitry sends the data packet to the second wireless device via the first antenna array.

2. The wireless device of claim 1, wherein the first beamformer circuit comprises:

a first radio frequency (RF) module coupled between the first phase shifter and the first element;

a second RF module coupled between the second phase shifter and the second element;

a third RF module coupled between the third phase shifter and the third element; and a fourth RF module coupled between the fourth phase shifter and the fourth element, wherein:

the beamformer configuration data comprises a first amplifier classifier that specifies use of no amplifier, a low noise amplifier (LNA), or a LNA and a power amplifier (PA);

the digital controller sends, to the first beamformer circuit the first amplifier classifier; and the first beamformer circuit sets the first RF module, the second RF module, the third RF module, and the fourth RF module to the first amplifier classifier.

3. The wireless device of claim 1, further comprising:

a second antenna array including a second plurality of elements;

second transceiver circuitry;

a second MIMO chain coupled to the second transceiver circuitry; and a second beamformer circuit coupled to the digital controller, the second antenna array, and the second MIMO chain via a second RF cable, wherein:

the WLAN radio further comprises:

second transceiver circuitry; and a second MIMO chain coupled to the second transceiver circuitry, wherein the second beamformer circuit comprises:

a second power splitter coupled to the second RF cable;

a fifth attenuator, a sixth attenuator, a seventh attenuator, and an eighth attenuator, each coupled to the second power splitter;

a fifth phase shifter coupled between the fifth attenuator and a first element of the second antenna array;

a sixth phase shifter coupled between the sixth attenuator and a second element of the second antenna array;

a seventh phase shifter coupled between the seventh attenuator and a third element of the second antenna array; and an eighth phase shifter coupled between the eighth attenuator and a fourth element of the second antenna array, wherein:

the digital controller sends, to the second beamformer circuit, the phase shifter angle value and the first attenuation value from the beamformer configuration data;

the second beamformer circuit causes the fifth phase shifter, the sixth phase shifter, the seventh phase shifter, and the eighth phase shifter to steer the pencil-beam radiation pattern at the phase shifter angle value; and the second beamformer circuit sets the fifth attenuator, the sixth attenuator, the seventh attenuator, and the eighth attenuator to the first attenuation value.

4. A method comprising:

receiving, by a digital controller of a first wireless device, a first data packet, the first data packet comprising a first destination address of a second wireless device;

retrieving, from a memory device, first beamformer configuration data associated with the first destination address, the first beamformer configuration data comprising a first phase shifter angle value associated with a radiation pattern and an indicator that specifies i) no amplifier, ii) use of a low noise amplifier (LNA), or iii) use of a LNA and a power amplifier (PA);

causing two or more phase shifters of a first beamformer circuit to be set to the first phase shifter angle value;

causing a first set of radio frequency (RF) modules to be set according to the indicator; and sending the first data packet to the second wireless device via a first antenna array using the first beamformer circuit and the first set of RF modules.

5. The method of claim 4, wherein:

the first beamformer configuration data further comprises a first attenuation value;

the first beamformer circuit further comprises two or more attenuators, each attenuator being coupled to a corresponding phase shifter of the two or more phase shifters; and the method further comprises causing the two or more attenuators to be set to the first attenuation value.

6. The method of claim 4, further comprising:

sending, to a second beamformer circuit, the first phase shifter angle value and a first attenuation value, the second beamformer circuit comprises two or more phase shifters, and two or more attenuators, each attenuator being coupled to a corresponding phase shifter of the two or more phase shifters;

causing the two or more phase shifters of the second beamformer circuit to be set to the first phase shifter angle value; and causing the two or more attenuators of the second beamformer circuit to be set to the first attenuation value.

7. The method of claim 4, wherein each phase shifter of the two or more phase shifters is an N-bit phase shifter, where $2^N$ is a number of phase states of the N-bit phase shifter, wherein a number of phase shifters is represented by, M, and wherein the two or more phase shifters is controlled to operate in one of $2^{(M*N)}$ phase combinations to steer the radiation pattern.

8. The method of claim 4, further comprising:

receiving, by the digital controller, a second data packet, the second data packet comprising a second destination address of a third wireless device;

retrieving, from the memory device, second beamformer configuration data associated with the second destination address, the second beamformer configuration data comprising a second phase shifter angle value associated with the radiation pattern, wherein the second phase shifter angle value is different than the first phase shifter angle value;

causing the two or more phase shifters to be set to the second phase shifter angle value; and sending the second data packet to the third wireless device via the first antenna array using the first beamformer circuit.

9. The method of claim 8, wherein:

the second beamformer configuration data further comprises a second attenuation value and a second indicator that specifies i) no amplifier, ii) use of a low noise amplifier (LNA), or iii) us of a LNA and a power amplifier (PA);

the first beamformer circuit further comprises two or more attenuators, each attenuator being coupled to a corresponding phase shifter of the two or more phase shifters; and the method further comprises:
causing the two or more attenuators to be set to the second attenuation value; and
causing the first set of RF modules to be set according to the second indicator.

10. The method of claim 4, wherein:
each of the RF modules comprises:
a first short-circuit path;
a second path comprising a first low noise amplifier (LNA) associated with a receive (RX) mode of a radio and a second short-circuit path associated with a transmit (TX) mode of the radio; and
a third path comprising a second LNA associated with the RX mode and a power amplifier (PA) associated with the TX mode.

11. A wireless device comprising:
a memory device storing beamformer configuration data;
a first antenna element, a second antenna element, a third antenna element, and a fourth antenna element, collectively configured to radiate electromagnetic energy in a radiation pattern;
a radio coupled to the memory device; and
a first beamformer circuit coupled to the radio via a first RF cable, wherein the first beamformer circuit comprises:
a first power splitter coupled to the first RF cable;
a first phase shifter coupled to the first antenna element, a second phase shifter coupled to the second antenna element, a third phase shifter coupled to the third antenna element, and a fourth phase shifter to the fourth antenna element; and
a first radio frequency (RF) module coupled to the first phase shifter, a second RF module coupled to the second phase shifter, a third RF module coupled to the third phase shifter, and a fourth RF module coupled to the fourth phase shifter, wherein the radio is to:
receive a first data packet, the first data packet comprising a first destination address of a second wireless device;
retrieve, from the memory device, first beamformer configuration data associated with the first destination address, the first beamformer configuration data comprising a first phase shifter angle value associated with a radiation pattern and an indicator that specifies i) no amplifier, ii) use of a low noise amplifier (LNA), or iii) use of a LNA and a power amplifier (PA);
send, to the first beamformer circuit, the first phase shifter angle value that causes the first phase shifter, the second phase shifter, the third phase shifter, and the fourth phase shifter to be set to the first phase shifter angle value;
send, to the first RF module, the second RF module, the third RF module, and the fourth RF module, the indicator that causes the first RF module, the second RF module, the third RF module, and the fourth RF module to be set according to the indicator; and
send the first data packet to the second wireless device using the first beamformer circuit and the first RF module, the second RF module, the third RF module, and the fourth RF module.

12. The wireless device of claim 11, wherein:
the first beamformer configuration data further comprises a first attenuation value;
the first beamformer circuit further comprises a first attenuator coupled to the first phase shifter, a second attenuator coupled to the second phase shifter, a third attenuator coupled to the third phase shifter, and a fourth attenuator coupled to the fourth phase shifter; and
the radio is further configured to set the first attenuator, the second attenuator, the third attenuator, and the fourth attenuator to the first attenuation value.

13. The wireless device of claim 11,
wherein the first RF module comprises:
a first short-circuit path;
a second path comprising a first low noise amplifier (LNA) for a receive (RX) mode of the radio and a second short-circuit path for a transmit (TX) mode of the radio; and
a third path comprising a second LNA for the RX mode and a power amplifier (PA) for the TX mode.

14. The wireless device of claim 11, further comprising:
a first front-end module (FEM) coupled between the radio and the first RF cable, wherein the FEM comprises:
a low noise amplifier (LNA) for a receive (RX) mode of the radio; and
a power amplifier (PA) for a transmit (RX) mode of the radio;
a second FEM coupled between the first phase shifter and the first antenna element;
a third FEM coupled between the second phase shifter and the second antenna element;
a fourth FEM coupled between the third phase shifter and the third antenna element; and
a fifth FEM coupled between the fourth phase shifter and the fourth antenna element.

15. The wireless device of claim 11, further comprising:
a fifth antenna element, a sixth antenna element, a seventh antenna element, and an eighth antenna element; and
a second beamformer circuit coupled to the radio via a second RF cable, wherein the second beamformer circuit comprises:
a second power splitter coupled to the second RF cable; and
a fifth phase shifter coupled to the fifth antenna element, a sixth phase shifter coupled to the sixth antenna element, a seventh phase shifter coupled to the seventh antenna element, and an eighth phase shifter coupled to the eighth antenna element, wherein the radio is to send, to the second beamformer circuit, the first phase shifter angle value that causes the fifth phase shifter, the sixth phase shifter, the seventh phase shifter, and the eighth phase shifter to be set to the first phase shifter angle value.

16. The wireless device of claim 15, wherein:
the first beamformer configuration data further comprises a first attenuation value;
the first beamformer circuit further comprises a first attenuator coupled to the first phase shifter, a second attenuator coupled to the second phase shifter, a third attenuator coupled to the third phase shifter, and a fourth attenuator coupled to the fourth phase shifter; and
the radio is further configured to set the first attenuator, the second attenuator, the third attenuator, and the fourth attenuator to the first attenuation value.

17. The wireless device of claim 11, wherein the first phase shifter is an N-bit phase shifter, where $2^N$ is a number of phase states of the N-bit phase shifter, wherein the first phase shifter, the second phase shifter, the third phase shifter, and the fourth phase shifter are controlled to operate in one of $2^{(4*N)}$ phase combination to steer the radiation pattern.

18. The wireless device of claim 16, further comprising:
a first front-end module (FEM) coupled to the radio and the first beamformer circuit;
a second FEM coupled between the first phase shifter and the first antenna element;
a third FEM coupled between the second phase shifter and the second antenna element;
a fourth FEM coupled between the third phase shifter and the third antenna element; and
a fifth FEM coupled between the fourth phase shifter and the fourth antenna element.

* * * * *